US012580453B2

(12) United States Patent
Yamarthi et al.

(10) Patent No.: US 12,580,453 B2
(45) Date of Patent: Mar. 17, 2026

(54) CONICAL MOTORS FOR USE WITH PUMPS

(71) Applicant: General Electric Company, Schenectady, NY (US)

(72) Inventors: David Raju Yamarthi, Bangalore (IN); Ravindra Shankar Ganiger, Bangalore (IN); John R. Yagielski, Scotia, NY (US); Venkata Subramanya Sarma Devarakonda, Bangalore (IN); Adam Joseph Wangler, West Chester, OH (US); Brian G. Brzek, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 249 days.

(21) Appl. No.: 18/456,189

(22) Filed: Aug. 25, 2023

(65) Prior Publication Data

US 2025/0047171 A1 Feb. 6, 2025

(30) Foreign Application Priority Data

Aug. 2, 2023 (IN) .............................. 202311051906

(51) Int. Cl.
| *H02K 11/21* | (2016.01) |
| *H02K 7/00* | (2006.01) |
| *H02K 11/30* | (2016.01) |

(52) U.S. Cl.
CPC ............. *H02K 11/21* (2016.01); *H02K 7/003* (2013.01); *H02K 11/30* (2016.01)

(58) Field of Classification Search
CPC ......... H02K 11/21; H02K 11/30; H02K 7/003

USPC .......................... 310/68 B, 77, 156.01, 261.1
See application file for complete search history.

(56) References Cited

U.S. PATENT DOCUMENTS

| 11,891,998 | B2 | 2/2024 | Yamarthi et al. |
| 11,927,105 | B1 | 3/2024 | Wangler et al. |
| 12,000,406 | B2 | 6/2024 | Yamarthi et al. |
| 12,209,507 | B2 | 1/2025 | Wangler et al. |
| 12,209,533 | B2 | 1/2025 | Rodriguez Erdmenger et al. |
| 12,297,845 | B2 | 5/2025 | Yamarthi et al. |
| 12,331,781 | B2 | 6/2025 | Raju et al. |
| 2002/0110450 | A1 | 8/2002 | Swinton |
| 2013/0093372 | A1* | 4/2013 | Thyagarajan ........... H02P 21/18 |
| | | | 318/400.04 |

(Continued)

FOREIGN PATENT DOCUMENTS

| CN | 106434326 A | 2/2017 |
| CN | 108625917 A | 10/2018 |

(Continued)

OTHER PUBLICATIONS

Todorov et al., "Analysis of non-uniform magnetic flux distribution in conical rotor double-speed induction motors," dated Jun. 6-8, 2019, 16th Conference on Electrical Machines, Drives and Power Systems (ELMA), 2 pages. Abstract provided.

*Primary Examiner* — Jose A Gonzalez Quinones
(74) *Attorney, Agent, or Firm* — Hanley, Flight & Zimmerman, LLC

(57) ABSTRACT

Conical motors for use with pumps are disclosed. Examples disclosed herein include an electric motor including a conical rotor, a first end of the conical rotor having a first diameter and a second end of the conical rotor having a second diameter, the second diameter different from the first diameter, and a conical stator aligned to the conical rotor.

18 Claims, 14 Drawing Sheets

(56)                    References Cited

U.S. PATENT DOCUMENTS

| | | |
|---|---|---|
| 2022/0045587 A1 | 2/2022 | Zatorski |
| 2023/0358235 A1 | 11/2023 | Yamarthi et al. |
| 2023/0358237 A1 | 11/2023 | Yamarthi et al. |
| 2023/0358242 A1 | 11/2023 | Raju et al. |
| 2023/0358247 A1 | 11/2023 | Yamarthi et al. |
| 2023/0358255 A1 | 11/2023 | Yamarthi et al. |
| 2024/0125271 A1 | 4/2024 | Yamarthi et al. |
| 2024/0167433 A1 | 5/2024 | Yamarthi et al. |
| 2024/0309882 A1 | 9/2024 | Yamarthi et al. |
| 2024/0337290 A1 | 10/2024 | M S et al. |

FOREIGN PATENT DOCUMENTS

| | | | | | |
|---|---|---|---|---|---|
| CN | 113606006 A | | 11/2021 | | |
| DE | 1020142025017 A | * | 2/2012 | | |
| EP | 4019744 A1 | | 6/2022 | | |
| GB | 2600237 A | | 4/2022 | | |
| JP | H07318688 A | * | 12/1995 | | |
| JP | 2005160203 A | * | 6/2005 | | |
| JP | 2013162677 A | | 8/2013 | | |
| KR | 20180115575 A | * | 10/2018 | ............ | F04D 17/12 |
| WO | 2015000153 A1 | | 1/2015 | | |
| WO | 2017196269 A1 | | 11/2017 | | |
| WO | WO-2019185211 A1 | * | 10/2019 | ............... | F02C 6/12 |

* cited by examiner

1300

1302

START

DETERMINE POSITIONAL INFORMATION OF A ROTOR SHAFT WITH RESPECT TO A STATOR

1304

DETECT A CHANGE IN THE POSITION OF THE ROTOR SHAFT

1306

ADJUST CURRENT FLOW RATE TO THE ROTOR AND THE STATOR IN RESPONSE TO THE CHANGED POSITION

END

CONICAL MOTORS FOR USE WITH PUMPS

RELATED APPLICATIONS

This patent claims the benefit of Indian Provisional Patent Application No. 202311051906, which was filed on Aug. 2, 2023. Indian Provisional Patent Application No. 202311051906 is hereby incorporated by reference in its entirety. Priority to India Provisional Patent Application No. 202311051906 is hereby claimed.

FIELD OF THE DISCLOSURE

This disclosure relates generally to fluid pumps, and, more particularly, to improved, more efficient pump design and operation.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
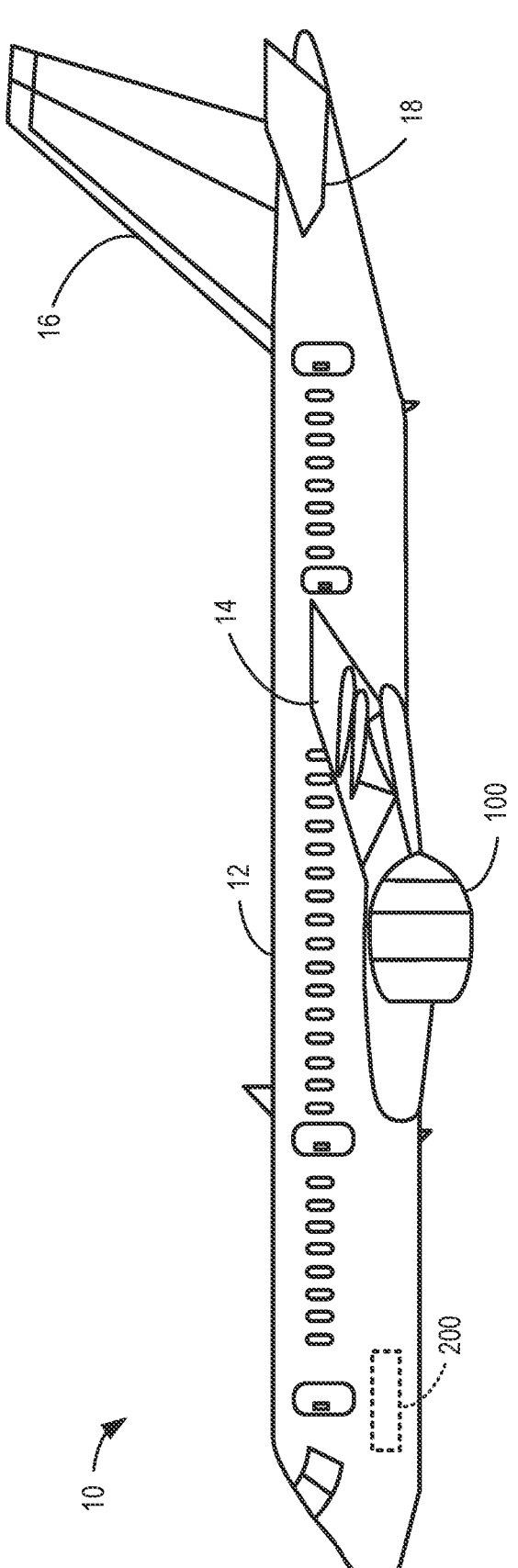
FIG. 1 is a side view of an example aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B.

As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

As used herein, in the context of describing the position and/or orientation of a first object relative to a second object, the term "substantially orthogonal" encompasses the term orthogonal and more broadly encompasses a meaning whereby the first object is positioned and/or oriented relative to the second object at an absolute angle of no more than five degrees (5°) from orthogonal. For example, a first axis that is substantially orthogonal to a second axis is positioned and/or oriented relative to the second axis at an absolute angle of no more than five degrees (5°) from orthogonal.

As used herein, "radially" is used to express a point or points along a radial vector originating at a central axis of a rotating body and pointing perpendicularly outward from the central axis. In some examples, fluid is said to accelerate radially outward from an impeller, meaning that the fluid flows outward from a central axis (axis of rotation) of the impeller at a direction that is substantially orthogonal to the central axis.

A centrifugal fluid pump moves fluid (e.g., fuel, water, oil, supercritical carbon dioxide ($sCO_2$), etc.) through systems (e.g., waste heat recovery (WHR) systems) by converting rotational kinetic energy of an impeller to hydrodynamic energy of the flowing fluid. In other words, the angular velocity of the impeller is directly proportional to the flow rate of the flowing fluid exiting the pump. The impeller is provided a change in rotational kinetic energy from an electric motor applying mechanical work to an impeller shaft coupled to the impeller and to a rotor of an electric motor. The rotor is provided a change in mechanical work over a period of time (e.g., mechanical power) from a stator in the electric motor applying electromagnetic forces to the rotor in the form of torque. When the motor supplies a constant amount of electrical energy to the stator, then the rotor supplies a constant amount of mechanical energy to the impeller.

During operation of the pump, spinning of an impeller shaft and the associated impeller can cause the impeller shaft to radially vibrate within housing(s) of the pump. The pump housing(s) internally frame(s) radial bearings (e.g., hydrodynamic bearings, foil bearings, rolling-element bearings, etc.) to support radial loads (e.g., weight) of the impeller shaft and dampen the vibrations.

Also, during pump operations, the impeller shaft may experience axial loads that act generally parallel to the central axis of the pump and/or impeller shaft. Axial loads acting on the impeller can be unbalanced, meaning that a forward axial load (e.g., axial load acting toward a forward portion of the pump) and an aft axial load (e.g., axial load acting toward an aft portion of the pump) can be unequal and produce an axial thrust of the impeller shaft. A forward or an aft axial thrust can cause the impeller shaft to shift along the central axis and cause parts coupled to the impeller shaft (e.g., impeller, rotor shaft, motor armature, etc.) to contact the housing(s), the motor, and/or other internal parts of the pump. The pump housing(s) include(s) axial bearings (e.g., hydrodynamic bearings, foil bearings, etc.) that support axial thrusts of the impeller shaft and reduce, inhibit, and/or dampen such movements.

In some examples, the fluid (e.g., $sCO_2$, oil, liquid helium, etc.) that the pump pressurizes in the system can be used to lubricate the radial and/or axial bearings to reduce frictional forces between rotating elements within those bearings. For example, the pump can include flowlines leading from a pump outlet to the axial bearings to provide and/or transmit pressurized fluid to a thrust bearing.

As used herein, a "flowline" can refer to a path (e.g., a flowpath, flow direction, etc.) of the fluid and/or a structure (e.g., pipe, casing, etc.) used to enclose (e.g., direct, guide, etc.) the fluid.

The pressurized fluid flows in between a thrust disc, a forward thrust pad, and an aft thrust pad of the thrust bearing apparatus, system, and/or assembly. The thrust disc is coupled to the impeller shaft and protrudes radially outward from the impeller shaft, and the thrust pads are coupled to the pump housing(s) and protrude radially inward toward the impeller shaft. Furthermore, the pump can include expeller vanes to drive the fluid from internal portions of the pump housing to the pump outlet. In some examples, expeller vanes protrude from an aft side of the impeller and function similarly to impeller vanes. That is, fluid approaches the expeller vanes along the central axis and accelerates radially outward from the expeller vanes. Thus, the flowlines and the expeller vanes can implement a lubricating circuit from the pump outlet to the axial bearing(s) and back to the expeller vanes to provide a continuous flow of the fluid to the axial load bearings.

During operation of the pump, axial thrust of the impeller shaft can act in forward or aft directions based on interactions between the impeller vanes/expeller vanes and the fluid. The fluid enters through the pump inlet along a central/rotating/shaft axis toward the impeller, which includes the impeller vanes to accelerate the fluid radially outward into a pump outlet, chamber, flowline, casing, etc. Fluid pressure on a forward side, end portion, face, etc., of the impeller can transfer aft axial loads to the impeller shaft in the aft direction.

Similarly, the fluid in the pump housing flows forward along the axis of rotation of the impeller shaft and builds up pressure on an aft side, end portion, face, etc. of the impeller (e.g., the expeller). Fluid pressure on an aft side of the impeller can transfer forward loads to the impeller shaft in the forward direction.

When the forward and aft axial loads are of equal values and act in opposite directions, the pump is said to be "thrust balanced." As used herein, "forward thrust" refers to unbalanced thrust of the impeller shaft acting in the forward direction due to the forward axial load exceeding the aft axial load. As used herein, "aft thrust" refers to unbalanced thrust of the impeller shaft acting in the aft direction due to the aft axial load exceeding the forward axial load.

In some examples, when the pump operates at substantially low rotational speeds, angular velocities, operating speeds, etc. (e.g., 500, 1,000, 2,500 revolutions per minute (rpm), etc.), the fluid pressure at the pump inlet exceeds the fluid pressure within the pump housing(s). Thus, at substantially low operating speeds ("low speeds"), aft thrust of the impeller shaft is induced.

In some examples, when the pump operates at substantially high rotational speeds, angular velocities, operating speeds, etc. (e.g., 5000, 10,000, 25,000 rpm, etc.), the fluid pressure within the pump housing(s) exceeds the fluid pressure at the pump inlet. Thus, at substantially high operating speeds ("high speeds"), forward thrust of the impeller shaft is induced.

When forward thrust or aft thrust is applied to the impeller shaft, axial displacement (e.g., in forward or aft directions) of the impeller shaft from an initial position can occur by some amount (e.g., 0.001, 0.005, 0.010 inches (in), etc.) despite the axial support of the thrust bearing(s). At some operational speeds of the pump, the axial thrust acting on the impeller shaft can oscillate between forward and aft directions. At such speeds, the thrust can oscillate at frequencies that known thrust bearings are incapable of adaptively and/or dynamically supporting or cannot support quickly, efficiently, and/or adequately enough. Example thrust bearings that are unable to balance pressure may fail to keep appropriate spacing between thrust pads, spacers, thrust discs, etc. In such examples, damage to thrust pads, thrust discs, impeller shafts, or other pump components can result.

Example electric motors disclosed herein can adjust (e.g., increase or decrease) torque output of an example pump to mitigate axial movement of the impeller shaft. Examples disclosed herein utilize conical rotors and conical stators to increase the available torque at the impeller shaft. For example, an axial component of the electromagnetic force between the conical rotor and the conical stator can balance axial load on the impeller shaft of an example pump. The electromagnetic force due to the interaction (e.g., magnetic fields) between the conical rotor and the conical stator can cause the conical rotor and the rotor shaft to move forward in the pump. This forward movement of the rotor and rotor shaft can counteract aft movement of the pump during operation.

Further, examples disclosed herein can detect positional data, operating conditions, environmental conditions, etc., of an example pump to control current flow to an example electric motor. Examples disclosed herein can increase current flow to an example electric motor in response to axial displacement of the impeller shaft. Additionally or alternatively, examples disclosed herein can adjust current flow to an example electric motor in response to operating conditions (e.g., rotational speeds, ambient temperature, etc.) of the example impeller shaft. In some examples, increasing the current flow to an example electric motor can increase the resultant electromagnetic forces between an example rotor and an example stator, which in turn counteracts forward or aft thrust due to the impeller shaft. Furthermore, example systems disclosed herein can improve the operational efficiency of the pump (e.g., centrifugal $sCO_2$ pump) by minimizing or otherwise reducing frictional energy losses associated with axial impeller shaft movement. Furthermore, the example systems disclosed herein can increase the time between maintenance services to repair and/or replace component(s) of the thrust bearing(s), motor, pump, etc.

For the figures disclosed herein, identical numerals indicate the same elements throughout the figures. Referring now to the drawings, FIG. 1 is a side view of an example aircraft 10. As shown in FIG. 1, the aircraft 10 includes a fuselage 12 and a pair of wings 14 (one is shown) extending outward from the fuselage 12. In the illustrated example, a gas turbine engine 100 (also referred to as "engine 100") is supported on each wing 14 to propel the aircraft through the air during flight. Additionally, the aircraft 10 includes a vertical stabilizer 16 and a pair of horizontal stabilizers 18 (one is shown). However, in some examples, the aircraft 10 includes engines of different types and/or in different positions than the illustrative example of FIG. 1.

Furthermore, the aircraft 10 can include a thermal management system 200 for transferring heat between fluids supporting the operation of the aircraft 10. More specifically, the aircraft 10 can include one or more accessory systems configured to support the operation of the aircraft 10. For example, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 200 is configured to transfer heat from one or more fluids supporting the operation of the aircraft 10 (e.g., the oil of the lubrication system, the air of the cooling system and/or the environmental control system, and/or the like) to one or more other fluids supporting the operation of the aircraft 10 (e.g., the fuel supplied to the engines 100). However, in some other examples, the thermal management system 200 is configured to transfer heat between another fluid or component supporting the operation of the aircraft 10.

Although examples disclosed herein are described with reference to the aircraft 10 of FIG. 1, examples disclosed herein can be applicable to another type or configuration of aircraft that uses a thermal management system substantially similar to the thermal management system 200 of FIGS. 1-3. Thus, the present subject matter can be readily adaptable to another aircraft and/or another heat transfer application associated with another type of vehicle.

Figure 2:
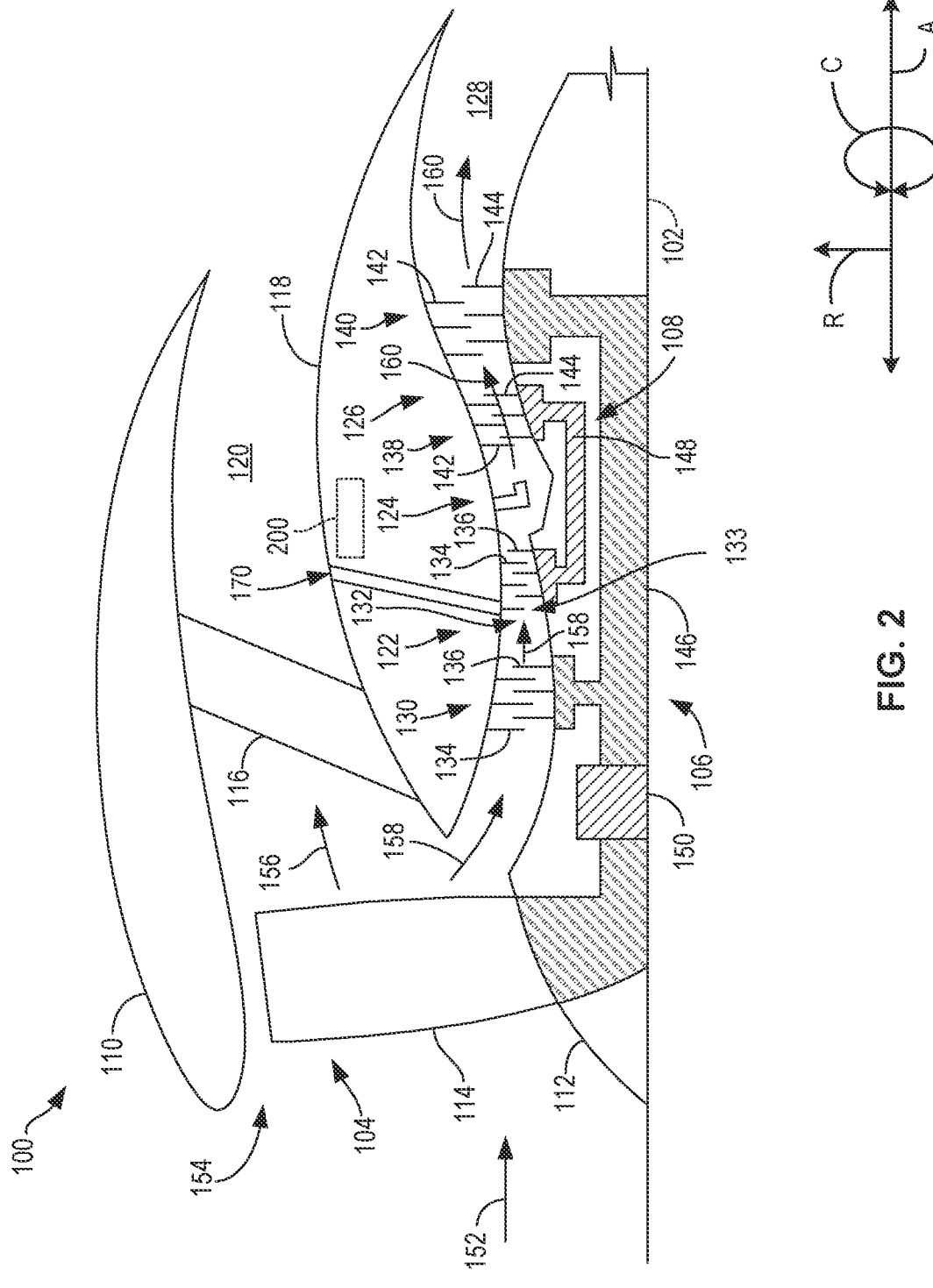
FIG. 2 is a schematic cross-sectional view of an example gas turbine engine of an aircraft.

FIG. 2 is a schematic cross-sectional view of an example gas turbine engine 100. In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 are circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128.

In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough.

Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes a low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 progressively compress the second portion 158 of the air 152. Next, the second portion 158 of the air 152 flows through the HP compressor 132 in which the compressor rotor blades 136 continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 in which the turbine rotor blades 144 of the HP turbine 138 extract a first portion of kinetic and/or thermal energy from the combustion gases 160. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy from the combustion gases 160. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 can include a thermal management system 200 for transferring heat between fluids supporting the operation of the aircraft 10. In this respect, the thermal management system 200 can be positioned within the engine 100. For example, as shown in FIG. 2, the thermal management system 200 is positioned within the outer casing 118 of the engine 100. However, in some other examples, the thermal management system 200 is positioned at another location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows a portion of the second portion 158 of the air 152 from the compressor section 122 to bypass the combustion section 124. More specifically, in some examples, the third-stream flow path 170 defines a concentric or non-concentric passage relative to the compressed air flow path 133 downstream of one or more of the compressors 130, 132 or the fan 104. The third-stream flow path 170 can be configured to selectively remove the second portion 158 of the air 152 from the compressed air flow path 133 via one or more variable guide vanes, nozzles, or other actuatable flow control structures.

In addition, as will be described below, in some examples, the thermal management system 200 transfers heat to the air flowing through the third-stream flow path 170. However, a pressure and/or a flow rate of a fluid (e.g., a heat exchange fluid such as a supercritical fluid (e.g., $sCO_2$) within the thermal management system 200 limits a rate at which thermal energy is transferred between the air and the heat exchange fluid. Additionally, it is advantageous for the thermal management system 200 to produce the pressure and/or the flow rate with pumps that support axial thrusts of the shaft within the pump to improve the lifespan and/or efficiency of the pump(s) and the thermal management system 200.

Although examples disclosed herein are described with reference to the gas turbine engine 100 of FIG. 2, examples disclosed herein can be applicable to another type or configuration of engine that uses a thermal management system substantially similar to the thermal management system 200 of FIGS. 1-3. Thus, the present subject matter can be readily adaptable to another engine and/or another heat transfer application associated with another type of vehicle.

Figure 3:
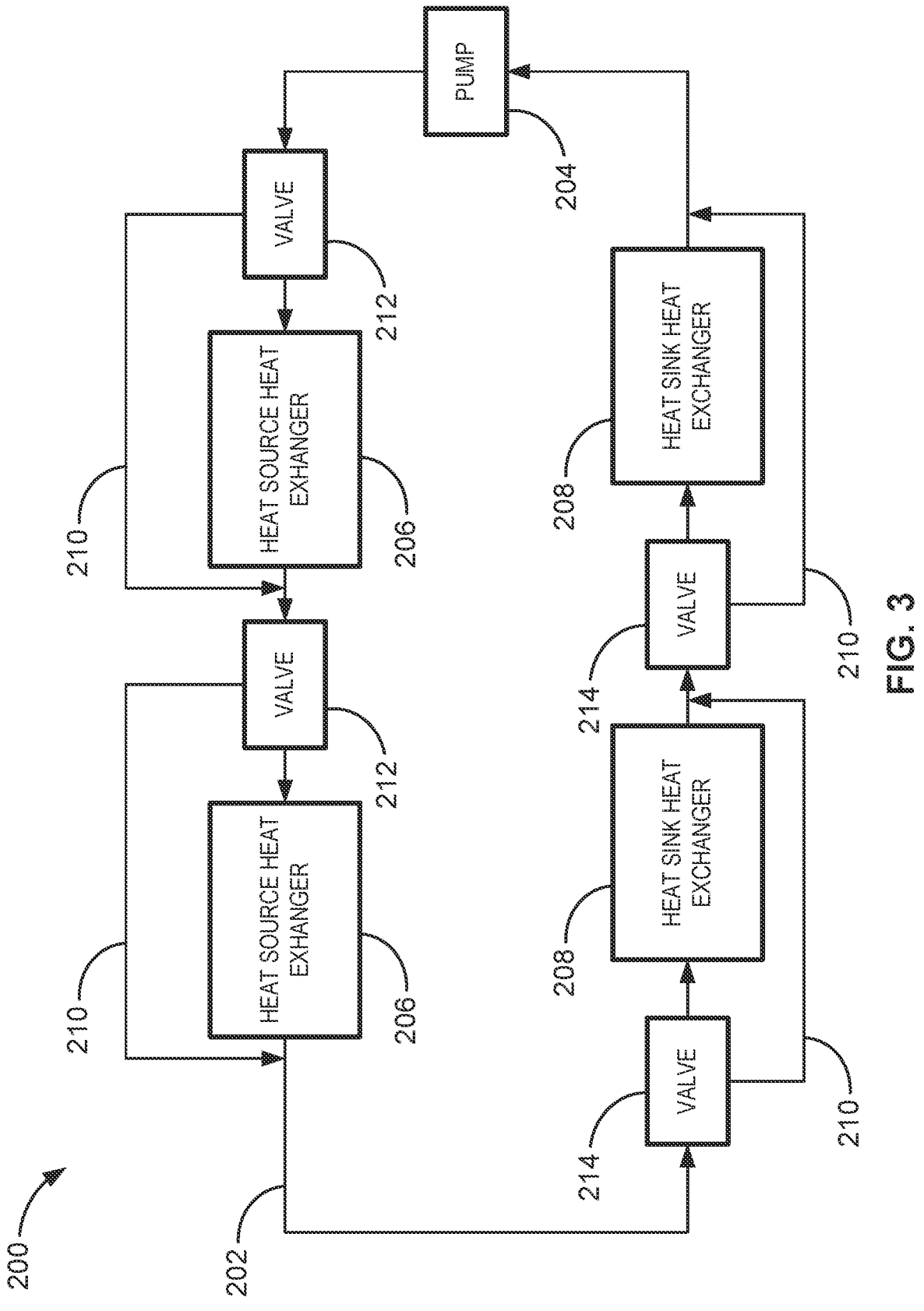
FIG. 3 is a schematic diagram of an example thermal management system for transferring heat between fluids.

FIG. 3 is a schematic view of an example implementation of the thermal management system 200 for transferring heat between fluids. In general, the thermal management system 200 is discussed in the context of the aircraft 10 and the gas turbine engine 100 described above and shown in FIGS. 1 and 2. However, the thermal management system 200 can be implemented within another type of aircraft and/or another gas turbine engine of another configuration.

As shown, the thermal management system 200 includes a thermal transport bus 202. Specifically, in some examples, the thermal transport bus 202 is configured as one or more fluid conduits through which a fluid (e.g., a heat exchange fluid) flows. As described below, the heat exchange fluid flows through various heat exchangers such that heat is added to and/or removed from the heat exchange fluid. In this respect, the heat exchange fluid can be a working fluid, such as $sCO_2$, oil, liquid helium, etc. Moreover, in such examples, the thermal management system 200 includes a pump 204 configured to pump the heat exchange fluid through the thermal transport bus 202.

Additionally, the thermal management system 200 includes one or more heat source heat exchangers 206 arranged along the thermal transport bus 202. More specifically, the heat source heat exchanger(s) 206 is fluidly coupled to the thermal transport bus 202 such that the heat exchange fluid flows through the heat source heat exchanger (s) 206. In this respect, the heat source heat exchanger(s) 206 is configured to transfer heat from fluids supporting the operation of the aircraft 10 to the heat exchange fluid, which cools the fluids supporting the operation of the aircraft 10. Thus, the heat source heat exchanger(s) 206 adds heat to the heat exchange fluid. Although FIG. 3 illustrates two heat source heat exchangers 206, the thermal management system 200 can include a single heat source heat exchanger 206 or three or more heat source heat exchangers 206.

The heat source heat exchanger(s) 206 can correspond to many configurations of heat exchanger(s) that cool a fluid supporting the operation of the aircraft 10. In some examples, at least one of the heat source heat exchangers 206 is a heat exchanger(s) of the lubrication system(s) of the engine(s) 100. In such examples, the heat source heat exchanger(s) 206 transfers heat from the oil lubricating the engine(s) 100 to the heat transfer fluid. In some other examples, at least one of the heat source heat exchangers 206 is a heat exchanger(s) of the cooling system of the engine(s) 100. In such examples, the heat source heat exchanger(s) 206 transfers heat from the cooling air bled from the compressor section(s) 122 (or a compressor discharge plenum) of the engine(s) 100 to the heat transfer fluid. However, in some other examples, the heat source heat exchanger(s) 206 corresponds to other types of heat exchangers that cool a fluid supporting the operation of the aircraft 10.

Furthermore, the thermal management system 200 includes a plurality of heat sink heat exchangers 208 arranged along the thermal transport bus 202. More specifically, the heat sink heat exchangers 208 are fluidly coupled to the thermal transport bus 202 such that the heat exchange fluid flows through the heat sink heat exchangers 208. In this respect, the heat sink heat exchangers 208 are configured to transfer heat from the heat exchange fluid to other fluids supporting the operation of the aircraft 10, which heats the other fluids supporting the operation of the aircraft 10. Thus, the heat sink heat exchangers 208 remove heat from the heat exchange fluid. Although FIG. 3 illustrates two heat sink heat exchangers 208, the thermal management system 200 can include three or more heat sink heat exchangers 208.

The heat sink heat exchangers 208 can correspond to many configurations exchangers that heat a fluid supporting the operation of the aircraft 10. For example, at least one of the heat sink heat exchangers 208 is a heat exchanger(s) of the fuel system(s) of the engine(s) 100. In such examples, the heat sink heat exchanger(s) 208 transfers heat from the heat transfer fluid to the fuel supplied to the engine(s) 100. In some other examples, at least one of the heat sink heat exchangers 208 is a heat exchanger(s) in contact with the first portion 156 of the air 152 flowing through the bypass airflow passage(s) 120 of the engine(s) 100. In such examples, the heat sink heat exchanger(s) 208 transfers heat from the heat exchange fluid to the first portion 156 of the air 152 flowing through the bypass airflow passage(s) 120.

In some examples, one or more of the heat sink heat exchangers 208 are configured to transfer heat to the air flowing through the third-stream flow path 170. In such examples, the heat sink heat exchanger(s) 208 is in contact with the air flow through the third-stream flow path 170 (FIG. 2). Thus, heat from the heat exchange fluid flowing through the thermal transport bus 202 can be transferred to the air flow through the third-stream flow path 170. The use of the third-stream flow path 170 as a heat sink for the thermal management system 200 provides one or more technical advantages. For example, the third-stream flow path 170 provides greater cooling than other sources of bleed air because a larger volume of air flows through the third-stream flow path 170 than other bleed air flow paths. Moreover, the air flowing through the third-stream flow path 170 is cooler than the air flowing through other bleed air flow paths and the compressor bleed air. Additionally, the air in the third-stream flow path 170 is pressurized, which allows the heat sink heat exchanger(s) 208 to be smaller than heat exchangers relying on other heat sinks within the engine 100. Furthermore, in examples in which the engine 100 is unducted, using the third-stream flow path 170 as a heat sink does not increase drag on the engine 100 unlike the use of ambient air (e.g., a heat exchanger in contact with air flowing around the engine 100). However, in some other examples, the heat sink heat exchangers 208 correspond to other types of heat exchangers that heat a fluid supporting the operation of the aircraft 10.

Moreover, in some examples, the thermal management system 200 includes one or more bypass conduits 210. Specifically, as shown, each bypass conduit 210 is fluidly coupled to the thermal transport bus 202 such that the bypass conduit 210 allows at least a portion of the heat exchange fluid to bypass one of the heat exchangers 206, 208. In some examples, the heat exchange fluid bypasses one or more of the heat exchangers 206, 208 to adjust the temperature of the heat exchange fluid within the thermal transport bus 202. The flow of example heat exchange fluid through the bypass conduit(s) 210 is controlled to regulate the pressure of the heat exchange fluid within the thermal transport bus 202. In the illustrated example of FIG. 3, each heat exchanger 206, 208 has a corresponding bypass conduit 210. However, in some other examples, other numbers of heat exchangers 206, 208 can have a corresponding bypass conduit 210 as long as there is at least one bypass conduit 210.

Additionally, in some examples, the thermal management system 200 includes one or more heat source valves 212 and one or more heat sink valves 214. In general, each heat source valve 212 is configured to control the flow of the heat exchange fluid through a bypass conduit 210 that bypasses a heat source heat exchanger 206. Similarly, each heat sink valve 214 is configured to control the flow of the heat exchange fluid through a bypass conduit 210 that bypasses a heat sink heat exchanger 208. In this respect, each valve 212, 214 is fluidly coupled to the thermal transport bus 202 and a corresponding bypass conduit 210. As such, each valve 212, 214 can be moved between fully and/or partially opened and/or closed positions to selectively occlude the flow of heat exchange through its corresponding bypass conduit 210.

The valves 212, 214 are controlled based on the pressure of the heat exchange fluid within the thermal transport bus 202. More specifically, as indicated above, in certain instances, the pressure of the heat exchange fluid flowing through the thermal transport bus 202 can fall outside of a desired pressure range. When the pressure of the heat exchange fluid is too high, the thermal management system 200 can incur accelerated wear. In this respect, when the pressure of the heat exchange fluid within the thermal transport bus 202 exceeds a maximum or otherwise increased pressure value, one or more heat source valves 212 open. In such examples, at least a portion of the heat exchange fluid flows through the bypass conduits 210 instead of the heat source heat exchanger(s) 206. Thus, less heat is added to the heat exchange fluid by the heat source heat exchanger(s) 206, which reduces the temperature and, thus, the pressure of the fluid. In some examples, the maximum pressure value is between 3800 and 4000 pounds per square inch or less. In some examples, the maximum pressure value is in a range between 2700 and 2900 pounds per square inch, such as 2800 pounds per square inch. In some other examples, the maximum pressure value is in a range between 1300 and 1500 pounds per square inch, such as 1400 pounds per square inch. Such maximum pressure values generally prevent the thermal management system 200 from incurring accelerated wear.

In some examples, the maximum pressure value is set prior to and/or during operation based on one or more parameters (e.g., materials utilized, pump 204 design, aircraft 10 design, gas turbine engine 100 design, heat exchange fluid, etc.) associated with the thermal management system 200. The example maximum pressure value can be adjusted relative to the pressure capacities of the thermal transport bus 202, the pump 204, the heat exchangers 206, 208, the bypass conduit(s) 210, and/or the valves 212, 214.

Conversely, when the pressure of the heat exchange fluid is too low, the pump 204 can experience operability problems and increased wear. As such, when the pressure of the heat exchange fluid within the thermal transport bus 202 falls below a minimum or otherwise reduced pressure value, one or more of the heat sink valves 214 open. In such examples, at least a portion of the heat exchange fluid flows through the bypass conduits 210 instead of the heat sink heat exchangers 208. Thus, less heat is removed from the heat exchange fluid by the heat sink heat exchangers 208, which increases the temperature and, thus, the pressure of the fluid. In some examples, the minimum pressure value is 1070 pounds per square inch or more. In some examples, the minimum pressure value is between 1150 and 1350 pounds per square inch, such as 1250 pounds per square inch. In some other examples, the minimum pressure value is between 2400 and 2600 pounds per square inch, such as 2500 pounds per square inch. Such minimum pressure values are generally utilized when the heat exchange fluid is in a supercritical state (e.g., when the heat exchange fluid is carbon dioxide).

As such, the thermal management system 200 can be configured to operate such that the pressure of the heat transport fluid is maintained with a range extending between the minimum and maximum pressure values. In some examples, the range extends from 1070 to 4000 pounds per square inch. Specifically, in one example, the range extends from 1250 to 1400 pounds per square inch. In some other examples, the range extends from 2500 to 2800 pounds per square inch.

Accordingly, the operation of the pump 204 and the valves 212, 214 allows the disclosed thermal management system 200 to maintain the pressure of the heat exchange fluid within the thermal transport bus 202 within a specified range of values as the thermal load placed on the thermal management system 200 varies.

Furthermore, the example pump 204 drives the flow of the heat exchange fluid through the thermal management system 200. In some examples, the thermal management system 200 includes one pump 204 or multiple pumps 204 depending on the desired flow rate, delta pressure across the pump 204, and/or the kinetic energy loss of the heat exchange fluid in the thermal transport bus 202. For example, the pump 204 can increase the output pressure head to accelerate the flow of the heat exchange fluid to a first flow rate. As the heat exchange fluid passes through the thermal transport bus 202, the example kinetic energy of the heat exchange fluid dissipates due to friction, temperature variations, etc. Due to the kinetic energy losses, the heat exchange fluid decelerates to a second flow rate at some point upstream of the pump 204. When the example second flow rate is below a desired operating flow rate of the heat exchange fluid, the pump 204 can either be of a different architecture that outputs a higher first flow rate, or one or more additional pumps 204 can be included in the thermal management system 200.

Figure 4:
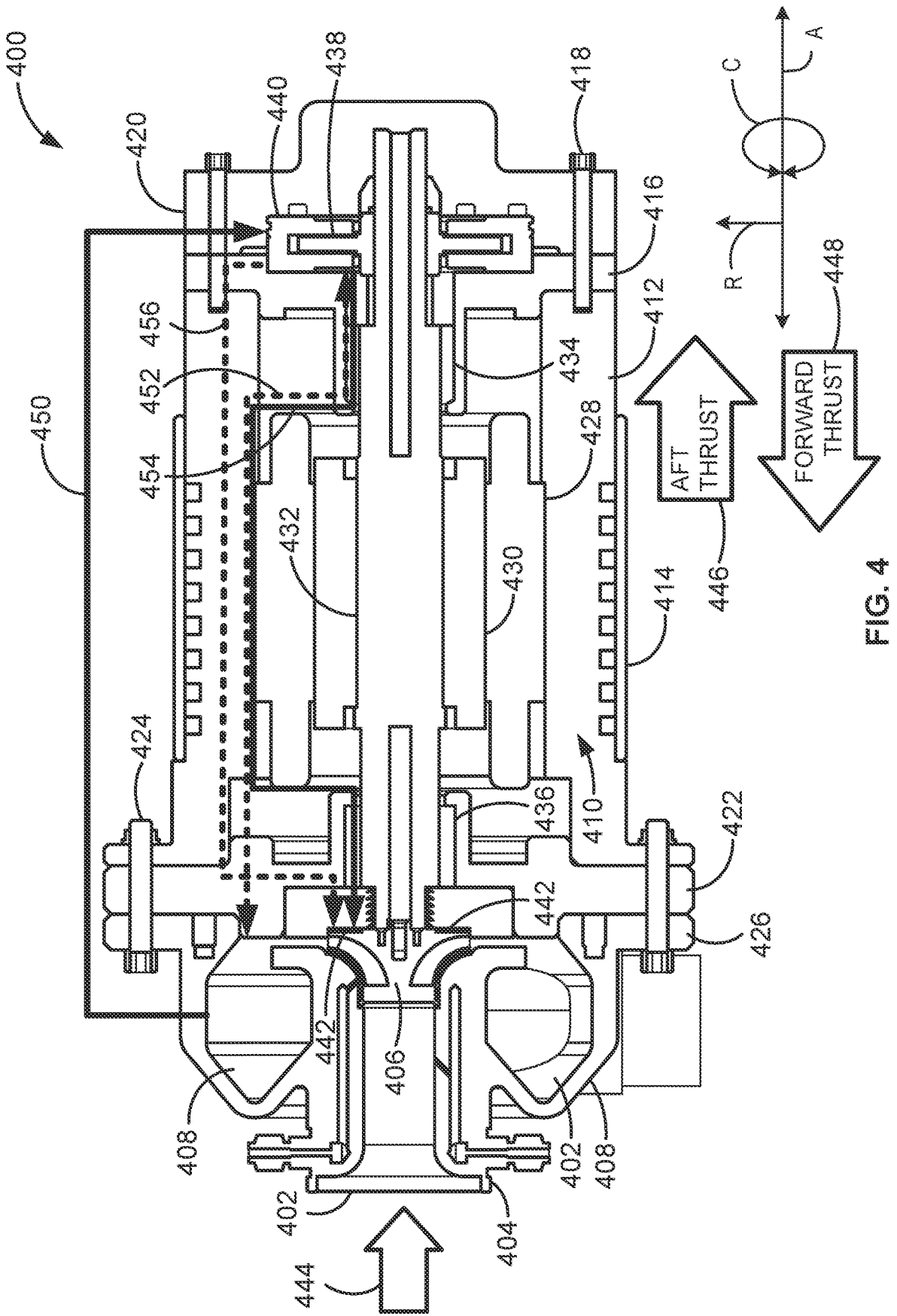
FIG. 4 is a schematic illustration of an example thermal transport bus pump.

FIG. 4 is a schematic illustration of an example thermal transport bus pump 400 (e.g., a $sCO_2$ pump, the pump 204 of FIG. 3, etc.). In the illustrated example of FIG. 4, the thermal transport bus pump 400 drives a heat exchange fluid, such as ($sCO_2$), through one or more fluid conduits (e.g., the thermal transport bus 202 of FIG. 3) 402. Specifically, the heat exchange fluid flows through an inlet pipe 404 and encounters an impeller 406 (e.g., a compressor wheel) that rotates to drive the heat exchange fluid through a pump outlet 408 fluidly coupled to the fluid conduit(s) 402. In turn, the fluid conduit(s) 402 can feed the heat exchange fluid to one or more heat exchangers (e.g., the heat exchanger 206, 208 of FIG. 3). Accordingly, the thermal transport bus pump 400 can pump the heat exchange fluid to manage a thermal energy of working fluids associated with the aircraft 10 of FIG. 1 and/or the gas turbine engine 100 of FIG. 2.

In the illustrated example of FIG. 4, the thermal transport bus pump 400 includes a motor 410 positioned in a motor housing 412. In FIG. 4, the motor 410 is an induction motor operatively coupled to a variable frequency drive (VFD) and controlling circuitry (not shown), such as a full authority digital engine control (FADEC), that controls a rotational speed of the motor 410. For example, the controlling circuitry can operate the motor 410 based on a pressure and/or a temperature of the heat exchange fluid in the fluid conduit (s) 402 and/or in the thermal transport bus pump 400. In some examples, the controlling circuitry can operate the motor 410 based on a pressure and/or a temperature of the working fluids affected by the heat exchange fluid. Additionally or alternatively, the controlling circuitry can operate the motor 410 based on vibration measurements obtained by accelerometers operatively coupled to the thermal transport bus pump 400 and/or the fluid conduit(s) 402.

In FIG. 4, the motor housing 412 is at least partially surrounded by a cooling jacket 414 to prevent the motor 410 from overheating. An aft end of the motor housing 412 is coupled to an aft bearing housing 416 via first bolts 418. Furthermore, an end cap 420 is coupled to the aft bearing housing 416 via the first bolts 418. A forward end of the motor housing 412 is coupled to a forward bearing housing 422 opposite the aft bearing housing 416 via second bolts 424. Moreover, the forward bearing housing 422 is coupled to a backplate 426 and the pump outlet 408 on an opposite side of the backplate 426 via the second bolts 424.

In the illustrated example of FIG. 4, the motor 410 includes a stator 428 to induce alternating electrical currents in field coils and emit alternating magnetic fields about a central axis of the motor 410. The alternating magnetic fields interact with permanent magnets of a rotor 430 and, in turn, provide torque to the rotor 430. The rotor 430 is fixedly coupled to an impeller shaft 432 ("shaft 432"), and the shaft is fixedly coupled to the impeller 406. As such, the motor 410 drives a rotation of the shaft 432 and, in turn, a rotation of the impeller 406. An aft end of the shaft 432 is supported by a first radial foil bearing 434, which is coupled to the aft bearing housing 416. Similarly, a forward end of the shaft 432 is supported by a second radial foil bearing 436 coupled to the forward bearing housing 422.

The first radial foil bearing 434 and the second radial bearing 436 include spring-loaded foil journal linings that support radial loads of the shaft 432 during substantially low (e.g., startup) rotational speeds (e.g., 0-5,000 rotations per minute (rpm), etc.). When the motor 410 causes the shaft 432 to rotate at a substantially high (e.g., operational) rotational speed (e.g., 5,000-20,000 rpm, etc.), a pressure of the working medium (e.g., air, oil, $sCO_2$), etc.) increases and pushes the foil lining radially outward. Thus, the pressurized working medium supports the radial loads of the shaft 432 when the shaft 432 is rotating at operational speeds (e.g., 3000 rpm, 10,000 rpm, 25,000 rpm, etc.).

In the illustrated example of FIG. 4, a thrust disc 438 of the shaft 432 is supported by a thrust bearing system 440. For example, the thrust bearing system 440 can include foil bearings to support axial loads of the shaft 432 via interactions with the thrust disc 438. In some examples, the thrust bearing system 440 is coupled to the aft bearing housing 416 and/or the end cap 420 via bolts.

The example impeller 406 of the thermal transport bus pump 400 includes expeller vanes 442 on an aft portion of the impeller 406. At operational speeds of the motor 410, the expeller vanes 442 cause the working fluid (e.g., $sCO_2$) to flow forward from the forward bearing housing 422, motor housing 412, etc. into the fluid conduit 402.

In the illustrated example of FIG. 4, the example $sCO_2$ fluid flows into the thermal transport bus pump 400 by way of the fluid conduit 402, as illustrated with an arrow indicating a flow direction 444. At low speeds (e.g., startup speeds) of the motor 410, the flow direction 444 of the example $sCO_2$ imparts an aft thrust 446 on the impeller 406 and the shaft 432 as illustrated with an arrow indicating a direction of the aft thrust 446. At high speeds (e.g., operational speeds) of the motor 410, the expeller vanes 442 drive the heat exchange fluid inside the thermal transport bus pump 400 forward toward the pump outlet 408, and the fluid generates a forward thrust 448 on the impeller 406 and the shaft 432, as illustrated with an arrow indicating a direction of the forward thrust 448. The thrust bearing system 440 is included in the thermal transport bus pump 400 to support the aft and forward thrusts 446, 448 of the shaft 432.

In some examples, the thermal transport bus pump 400 includes an example outer flowline 450 that diverges from the pump outlet 408 to provide $sCO_2$ as a working medium to the thrust bearing system 440 and to support the thrust disc 438 when pressurized. Additionally or alternatively, the outer flowline 450 diverges from the fluid conduit 402 and/or the expeller vanes 442. The example outer flowline 450 can circumvent one or more of the motor housing 412, the aft bearing housing 416, the forward bearing housing 422, and/or the backplate 426 to access the thrust bearing system 440.

In some examples, the thermal transport bus pump 400 includes an example inner flowline 452 that diverges from the expeller vanes 442 to provide $sCO_2$ as a working medium to the thrust bearing system 440 and to support the thrust disc 438 when pressurized. Additionally or alternatively, the inner flowline 452 diverges from the fluid conduit 402 and/or the pump outlet 408. The example inner flowline 452 can pass through one or more of the motor housing 412, the aft bearing housing 416, the forward bearing housing 422, and/or the backplate 426 to access the thrust bearing system 440.

The outer and inner flowlines 450, 452 of FIG. 4 are illustrated as example configurations to reflect general locations of the flowlines and directions of the flow. Although both the outer and inner flowlines 450, 452 are illustrated in FIG. 4, only one may be included in the thermal transport bus pump 400 to achieve a same function. The thermal transport bus pump 400 can be configured with the outer flowline 450 to reduce complication during fabrication and/or assembly and to reduce risk of internal leakages. The thermal transport bus pump 400 can be configured with the inner flowline 452 to reduce an amount of space the thermal transport bus pump 400 occupies. Also illustrated in FIG. 4 are first return flowline(s) 454 and second return flowline(s) 456 to generally depict exit points and flow directions of the working fluid from the thrust bearing system 440 to the expeller vanes 442.

Figure 5:
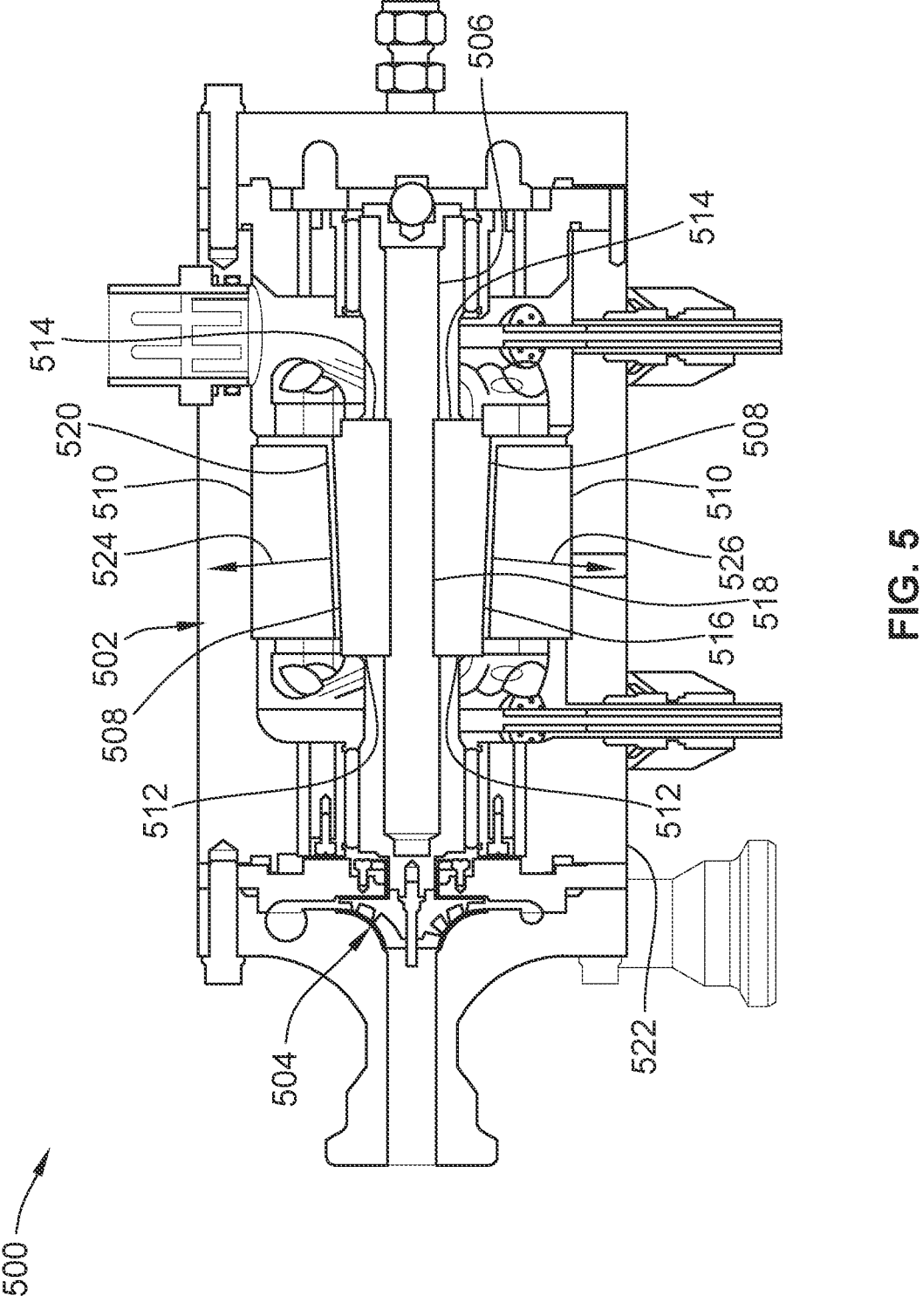
FIG. 5 illustrates a first example pump system in accordance with the teachings disclosed herein.

FIG. 5 is a cross-sectional view of a first example pump system 500 for pressurizing fluid (e.g., a heat exchange fluid such as $sCO_2$) in a system (e.g., the thermal management system 200 of FIG. 3). The example pump system 500 includes an example motor 502 and an example impeller 504. The example motor 502 includes an example rotor shaft 506, an example rotor 508, and an example stator. In this example, the motor 502 included in the example pump system 500 is similar to the thermal transport pump 400 of FIG. 4. However, the example motor 502 can be included in any other example system. The example pump system 500 illustrated in FIG. 5 includes the impeller 504 to pressurize the fluid (e.g., $sCO_2$) in the system. The example impeller 504 is connected to the rotor shaft 506 (e.g., impeller shaft) and rotates at a same rotational speed as the rotor shaft 506. In some examples, the impeller 504 is the same as or similar to impellers used in centrifugal pumps and includes vanes or blades to deflect flow of the incoming fluid radially outwards into outlet flowlines (e.g., the outlet flowline 450 of FIG. 4). The example impeller 504 converts mechanical power of the motor 502 (e.g., the rotor shaft 506 and the stator 510) into hydrodynamic power of the fluid flow.

In the example pump system 500 of FIG. 5, the stator 510 applies torque on the rotor 508. Since the example rotor 508 is connected (e.g., fixedly coupled) to the rotor shaft 506 (e.g., via bolts, adhesives, interference fit, etc.), the stator 510 causes the rotor 508 the rotor shaft 506 to rotate while the stator 510 remains stationary. In some examples, the stator 510 includes field magnets (e.g., electromagnets or permanent magnets) that generate magnetic field(s) based on an electric current (e.g., direct current or alternating current) passing through various electromagnets of the stator 510. The example stator 510 generates a first set of magnetic fields that apply a force on a second set of magnetic fields generated by the rotor 508. The example rotor 508 generates the second set of magnetic fields via permanent magnets or electromagnets. Thus, the stator 510 and the rotor 508 are magnetically coupled. Since the example stator 510 is stationary and fixed in place, the force causes the example rotor 508 to rotate and to produce a torque. Since the example rotor shaft 506 is connected to the example rotor 508, the rotor shaft 506 produces the same torque and rotates at the same angular velocity.

The example rotor 508 and the example stator 510 have a generally conical shape. The example rotor 508 includes a first example end 512 having a first outer diameter and a second example end 514 having a second outer diameter, the second diameter different (e.g., less) than the first diameter. For example, the ratio between the second diameter and the first diameter can vary in a range from 1.3 to 3.0. In other words, the example rotor 508 includes at least one example tapered surface 516 (e.g., a first example tapered surface 516) defined by an angle relative to a centerline of the motor 502 that is greater than 0 degrees and less than 90 degrees. The first example tapered surface 516 is an outer surface of the rotor 508 facing away from the rotor shaft 506. In this example, an example inner surface 518 of the rotor 508 faces the rotor shaft 506. Further, the example inner surface 518 is substantially parallel (e.g., within 5 degrees) to the rotor shaft 506. The example stator 510 is aligned (e.g., concentrically aligned, concentric, coaxial, etc.) to the example rotor 508. Accordingly, the example stator 510 is positioned to surround the first tapered surface 516. In this example, the stator 510 includes a second example tapered surface 520, the second tapered surface 520 aligned to the first tapered surface 516. In some examples, the pump system 500 can include an example motor housing 522 that encloses (e.g., covers) the motor 502, the rotor 508, and the stator 510.

During operation of the example pump system 500, example tapered surfaces 516, 520 cause the resultant magnetic force (from the magnetic interaction between the stator 510 and the rotor 508) to tilt or be angled. In FIG. 5, the resultant magnetic force can be angled in a direction generally shown by example resultant force vectors 524, 526. Axial components of the resultant force vectors 524, 526 can counteract (e.g., balance) axial loads in the pump system 500. For example, the resultant force represented by the vectors 524, 526 can cause the rotor 508 and the rotor shaft 506 to move forward in the pump system 500. This forward movement of the rotor 508 and the rotor shaft 506 can counteract aft movement of the rotor shaft 506 during operation.

Figure 6:
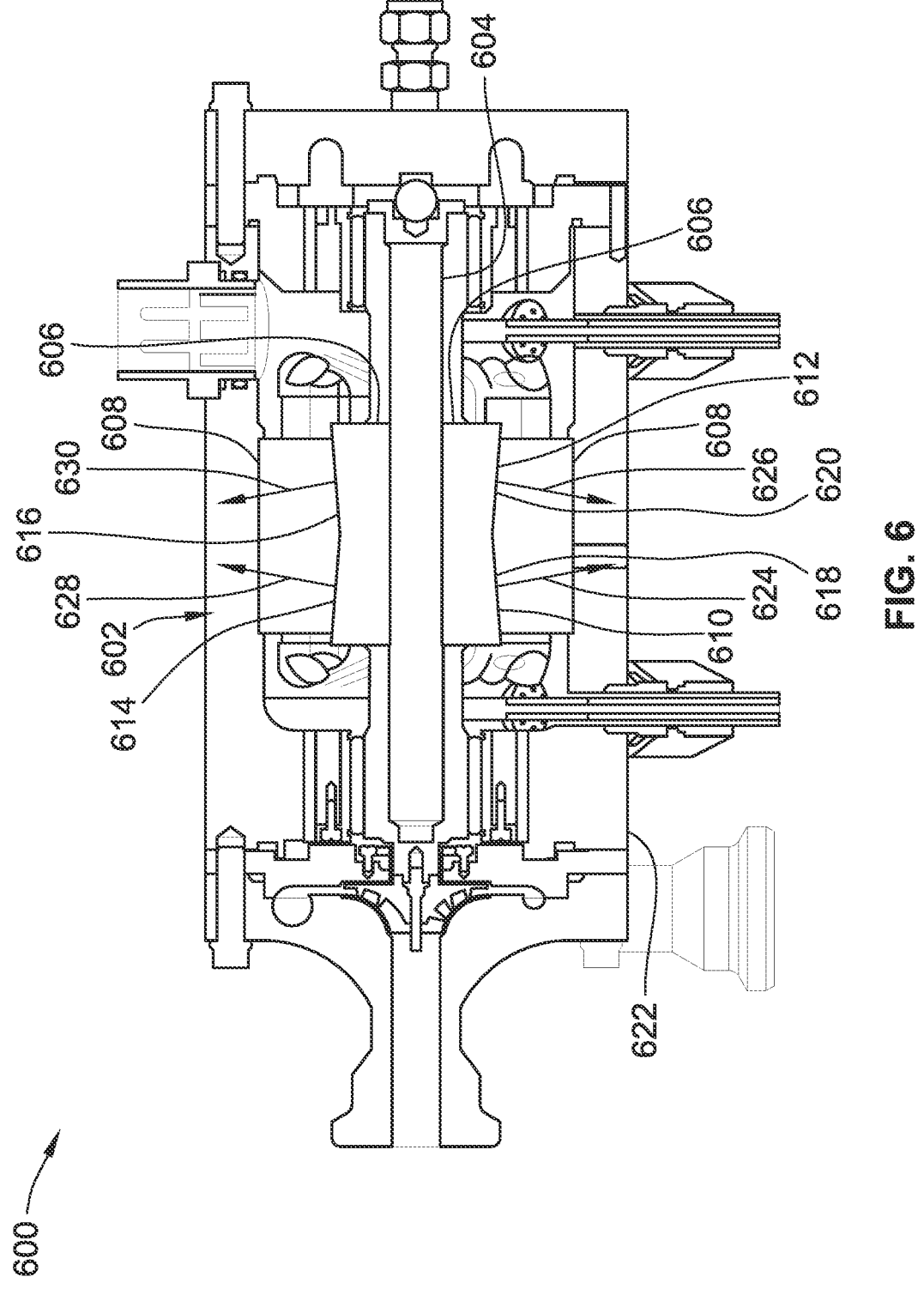
FIG. 6 illustrates a second example pump system in accordance with the teachings disclosed herein.

FIG. 6 is a cross-sectional view of a second example pump system 600 for pressurizing fluid in a system. The example pump system 600 includes an example motor 602. The example motor 602 includes an example rotor shaft 604, an example rotor 606, and an example stator 608. The example rotor 606 of FIG. 6 is similar to the example rotor 508 of FIG. 5. However, the example rotor 606 in FIG. 6 includes a first example conical portion 610 adjacent to a second example conical portion 612. The first example conical portion 610 includes a first example tapered surface 614 and the second example conical portion 612 includes a second example tapered surface 616 adjacent to the first tapered surface 614. In this example, the first and second tapered surfaces 614, 616 face away from the rotor shaft 604. In some examples, the first example tapered surface 614 is positioned to (e.g., tilted at) a first angle (e.g., 20 degrees) with respect to the rotor shaft 604 and the second tapered surface 616 is positioned to a second angle (e.g., 10 degrees) with respect to the rotor shaft 604, the second angle different than the first angle. In some examples, the first tapered surface 614 or second tapered surface 616 can be approximately parallel (e.g., within 5 degrees) to the example rotor shaft 604. Further, the example stator 608 is aligned to the tapered surfaces 614, 616. The example inner surfaces 618, 620 of the stator 608 surround the tapered surfaces 614, 616 of the rotor 606. In this example, the inner surfaces 618, 620 can be tapered to align to the tapered surfaces 614, 616 of the rotor 606. In some examples, the pump system 600 can include an example motor housing 622 that encloses (e.g., covers) the motor 602, the rotor 606, and the stator 608.

During operation of the example pump system 600, example tapered surfaces 614, 616, 618, 620 of the rotor 606 and the stator 608 tilt the resultant magnetic forces between the rotor 606 and the stator 608 in a direction generally shown by example resultant force vectors 624, 626, 628, 630. Axial components of the resultant force vectors 624, 626, 628, 630 can counteract (e.g., balance) axial loads in the pump system 600. For example, the resultant force represented by the vectors 626, 630 can cause the rotor 606 and the rotor shaft 604 to move forward in the pump system 600. This forward movement of the rotor 606 and the rotor shaft 604 can counteract aft movement of the rotor shaft 604 during operation. Additionally or alternatively, the resultant force represented by the vectors 624, 628 can cause the rotor 606 and the rotor shaft 604 to move aft in the pump system 600. This aft movement of the rotor 606 and the rotor shaft 604 can counteract forward movement of the rotor shaft 604 during operation.

Figure 7:
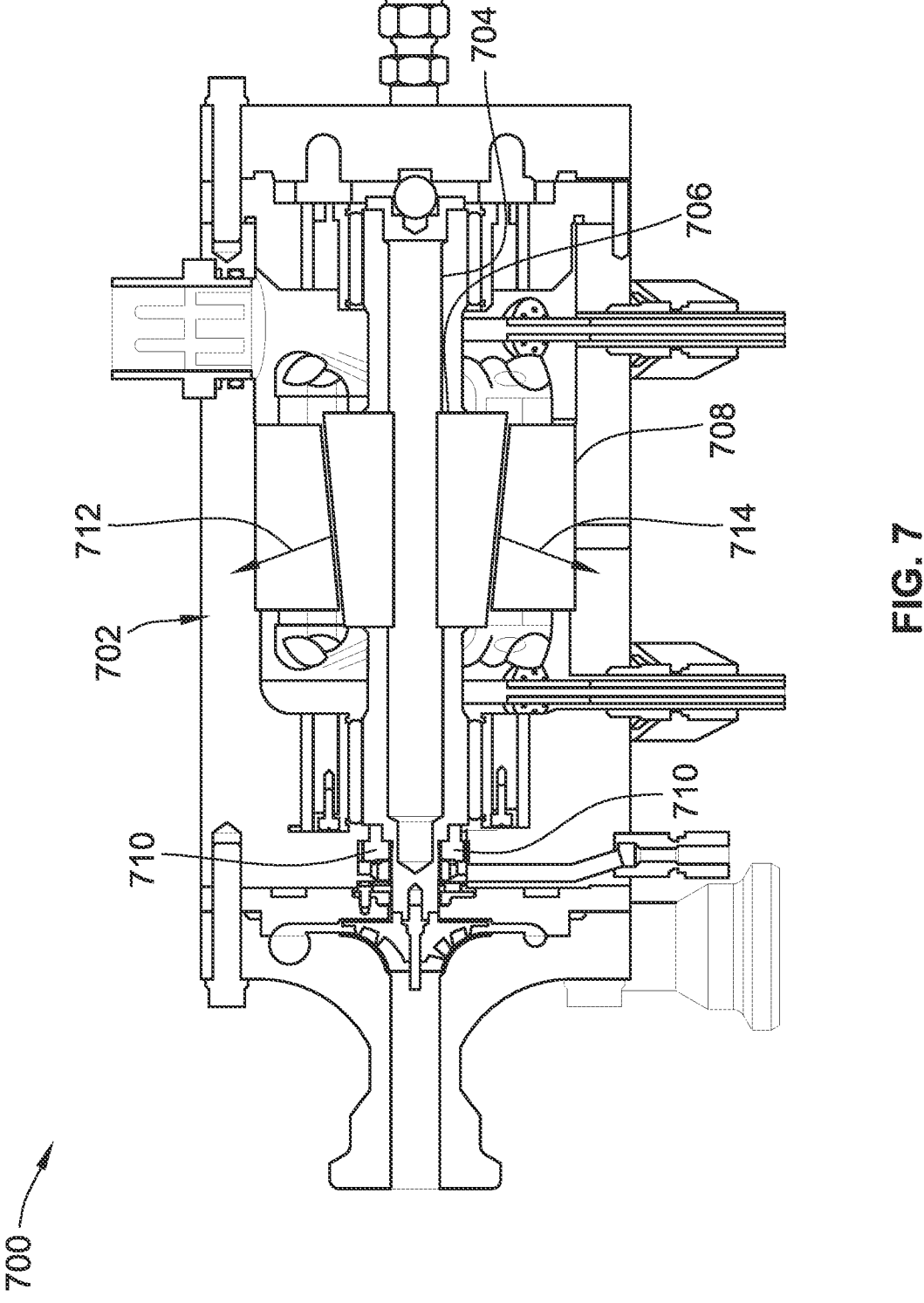
FIG. 7 illustrates a third example pump system in accordance with the teachings disclosed herein.

FIG. 7 is a cross-sectional view of a third example pump system 700 for pressurizing fluid in a system. The example pump system 700 includes an example motor 702. The example motor 702 includes an example rotor shaft 704, an example rotor 706, and an example stator 708. The example pump system 700 of FIG. 7 is similar to the example pump system 500 of FIG. 5. However, the example pump system 700 includes example thrust discs 710 coupled to the rotor shaft 704. In this example, the thrust discs 710 are positioned forward of the motor 702. In other examples, the thrust discs 710 are positioned aft of the motor 702. In FIG. 7, example resultant force vectors 712, 714 due to the conical shape of the rotor 706 and the stator 708 can counteract (e.g., balance) axial loads in the pump system 700. For example, the resultant force represented by the vectors 712, 714 can cause the rotor 706 and the rotor shaft 704 to move forward in the pump system 700. This forward movement of the rotor 706 and the rotor shaft 704 can counteract aft movement of the rotor shaft 704 during operation. Additionally or alternatively, the example thrust discs 710 can prevent or otherwise reduce axial movement of the rotor shaft 704. The example thrust discs 710 are fixed to the rotor shaft 704 and extend from the rotor shaft 704 substantially perpendicular (e.g., within 5 degrees) to an example axis of rotation of the rotor shaft 704. As the rotor shaft 704 rotates, an axial and/or thrust load is transferred to the thrust discs 710 to counteract the axial load from the rotor shaft 704 while allowing the rotor shaft 704 to rotate.

Figure 8:
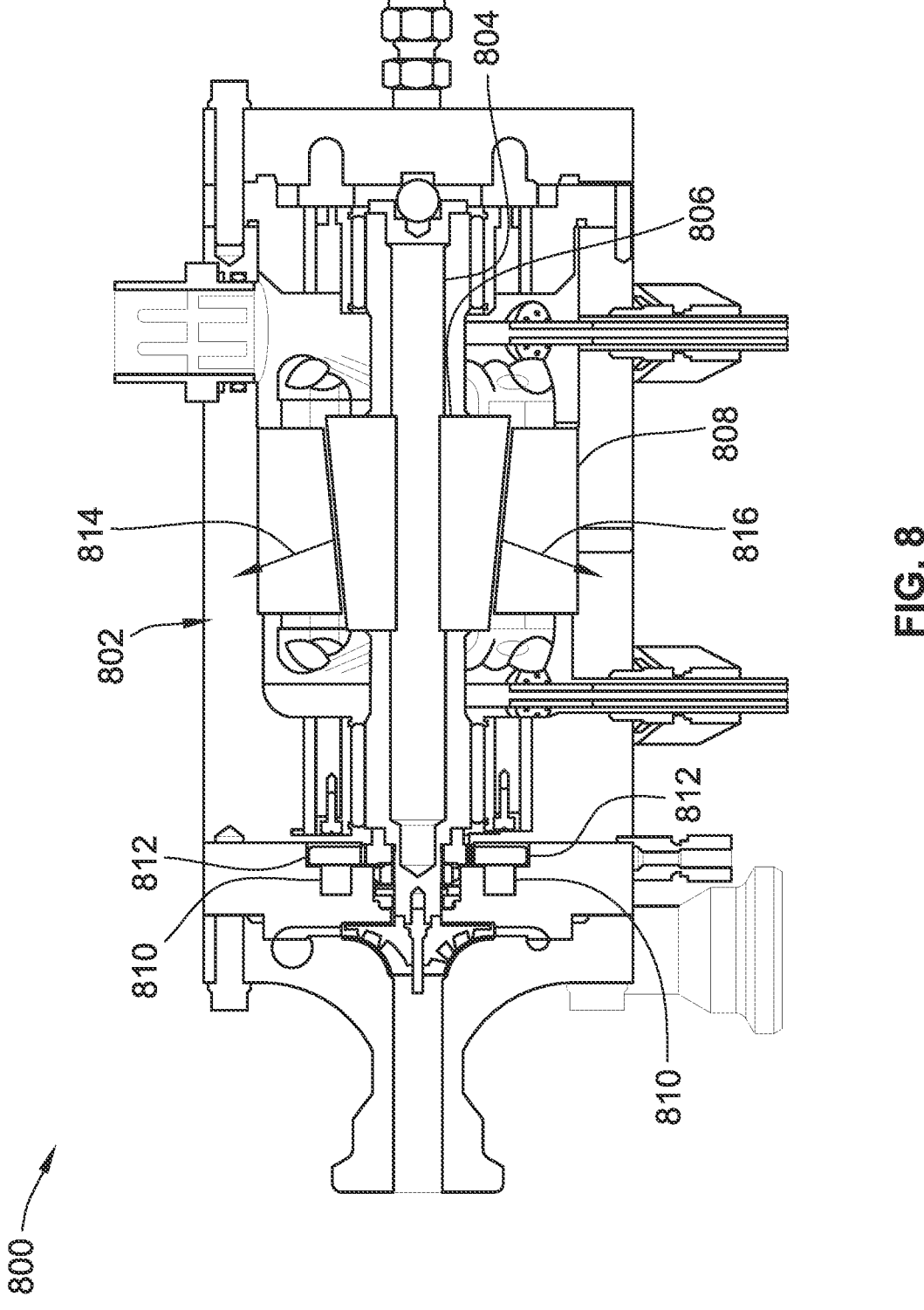
FIG. 8 illustrates a fourth example pump system in accordance with the teachings disclosed herein.

FIG. 8 is a cross-sectional view of a fourth example pump system 800 for pressurizing fluid in a system. The example pump system 800 includes an example motor 802 including an example rotor shaft 804, an example rotor 806, and an example stator 808. The example pump system 800 of FIG. 8 is similar to the example pump system 700 of FIG. 7. However, the example pump system 800 includes example piston seals 810 positioned adjacent to example thrust discs 812. In FIG. 8, example resultant force vectors 814, 816 due to the conical shape of the rotor 806 and the stator 808 can counteract (e.g., balance) axial loads in the pump system 800. For example, the resultant force represented by the vectors 814, 816 can cause the rotor 806 and the rotor shaft 804 to move forward in the pump system 800 to counteract aft movement of the rotor shaft 804 during operation. Additionally or alternatively, the example thrust discs 812 can prevent or otherwise reduce axial movement of the rotor shaft 804. As the rotor shaft 804 rotates and transfers an axial or thrust load to the thrust discs 812, the example piston seals 810 counteract (e.g., cushion, support, etc.) the axial load from the thrust discs 812 while allowing the rotor shaft 804 to rotate.

Figure 9:
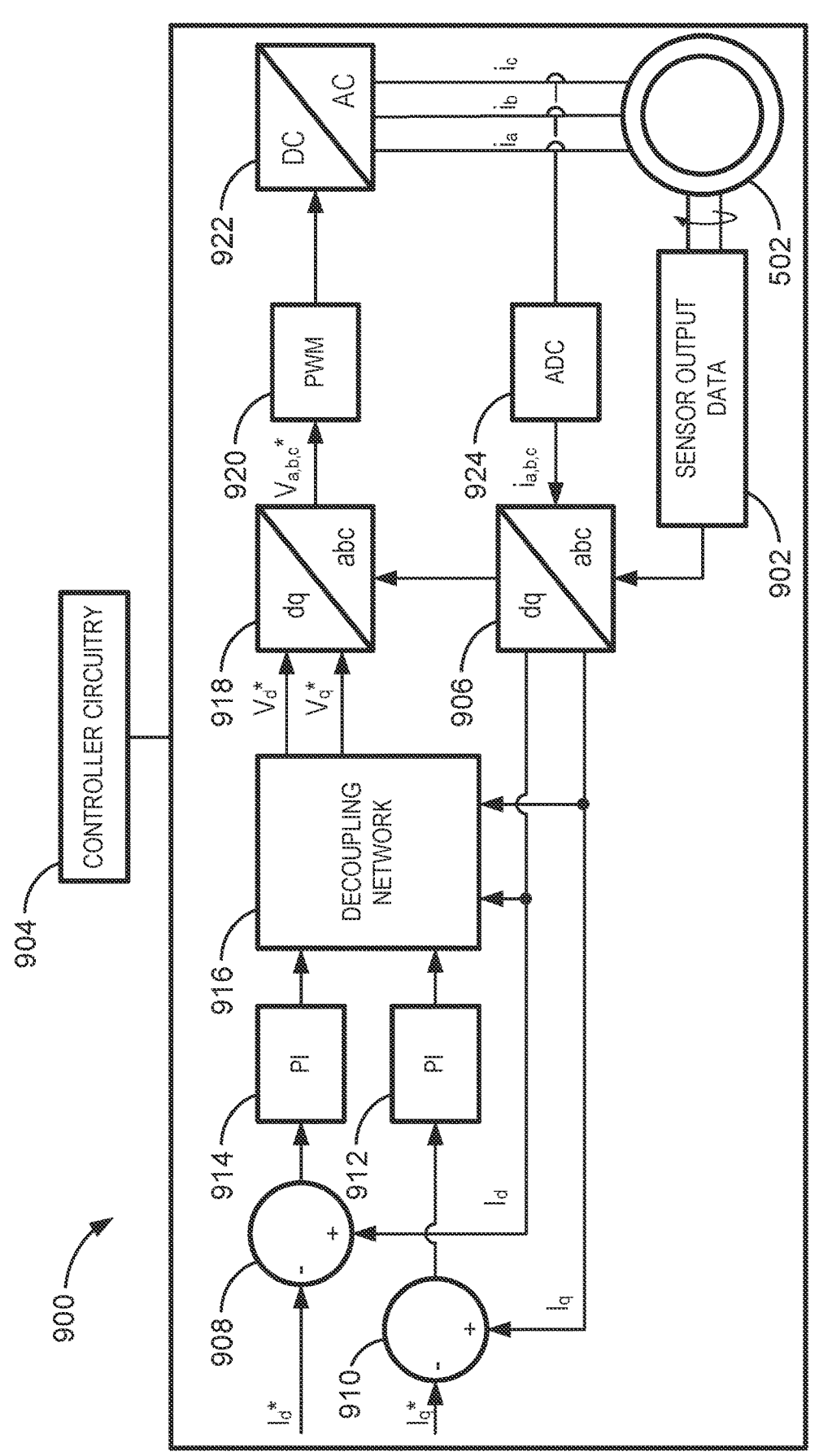
FIG. 9 is an example diagram of a first example process to control current flow provided to an example electric motor.

FIG. 9 is an example diagram of a first example process 900 to control current flow provided to an example electric motor. For purposes of explanation, the example process 900 is described with respect to the example pump system 500 of FIG. 5. However, the example process 900 can be implemented in the example pump system 600 of FIG. 6, the example pump system 700 of FIG. 7, or the example pump system 800 of FIG. 8. The first example process 900 includes example sensor output data 902 from an example sensor to determine an axial position (e.g., axial position estimation) of the motor 502 with respect to the rotor shaft 506. In particular, the example sensor can determine displacement between the stator 510 and the rotor 508, the rotor 508 being fixedly coupled to the rotor shaft 506. In some examples, the sensor can be positioned (e.g., disposed on, adjacent to, etc.) the motor housing 522 or any other location near the motor 502. In some examples, the motor 502 can be a permanent magnet embedded in steel motor (PMSM), a switched reluctance motor (SRM), or an induction motor. In some examples, the sensor can be a hall effect sensor, a variable reluctance sensor, an optical sensor, an eddy current sensor, a linear variable differential transformer (LVDT) sensor, etc.

In FIG. 9, example controller circuitry 904 controls (e.g., adjusts, alters, manages, etc.) current flow to the example motor 502. The example process 900 begins when the example sensor output data 902 indicates movement of the motor 502 with respect to the rotor shaft 506. For example, when forward thrust or aft thrust is applied to the rotor shaft 506, axial displacement (e.g., in forward or aft directions) of the rotor shaft 506 (and the rotor 508) from an initial position can occur by some amount. At block 906, the example controller circuitry 904 converts the sensor output data 902 from a three-phase (abc) signal to a dq rotating reference frame (dq). At example nodes 908, 910, the example controller circuitry 904 determines an adjusted current input ($I_q$ and $I_d$) based on the example sensor output data 902 and the initial current input ($I_q^*$ and $I_d^*$). In this example, current flow on a quadrature (q) axis (e.g., $I_q$ and $I_q^*$) represents an axis on which torque is produced by the motor 502. Additionally, current flow on a direct (d) axis (e.g., $I_d$ and $I_d^*$) represents an axis on which flux is produced by the motor 502.

The example process 900 includes an example proportional integral (PI) controller 912 to monitor the adjusted current input $I_q$. The example controller circuitry 904 can modify (e.g., increase or decrease) the adjusted current input $I_q$ based on deviations, error messages, etc., from the PI controller 912. Further, the example process 900 includes an example PI controller 914 to monitor the adjusted current input $I_d$. The example controller circuitry 904 can modify the adjusted current input $I_d$ based on deviations, error messages, etc., from the PI controller 914. The example controller circuitry 904 can control the adjusted current inputs $I_q$, la independently due to an example decoupling network 916. Further, the example controller circuitry 904 can determine output voltage in the q axis ($V_q^*$) and output voltage in the d axis ($V_d^*$) based on the decoupling network 916.

At block 918, the example controller circuitry 904 converts the output voltages $V_q^*$ and $V_d^*$ from the dq reference frame to the three-phase (abc) signal ($V_{a,b,c}^*$). As such, an example pulse-width-modulator (PWM) 920 can control the speed of the motor 502 via a series of pulses/signals. At block 922, the example controller circuitry 904 converts the pulses from the PWM 920 from direct current (DC) to alternating current (AC). In some examples, an example analog to digital converter (ADC) 924 converts the pulses from AC to DC. In turn, the example motor 502 accesses the pulses from the PWM 920 and adjusts current flow accordingly.

By way of the example process 900, an example sensor can detect aft displacement of the rotor shaft 506 with respect to the stator 510. The example controller circuitry 904 can adjust the amount of current to supply to the motor 502 based on such displacement. In some examples, increasing an amount of current to supply to the motor 502 can increase the speed of the motor 502 and, in turn, can increase the magnitude of the resultant force vectors 524, 526 (induced by the generally conical shape of the rotor 508 and the stator 510). As such, the increased resultant force moves the rotor 508 and the rotor shaft 506 forward in the pump system 500, which balances the initial aft displacement of the rotor shaft 506. The example controller circuitry 904 can determine current flow supplied to the motor 502 based on displacement of the rotor shaft 506. In other words, the example resultant forces 524, 526 are a function of current ($I_q$ and $I_d$) supplied to the motor 502.

Additionally or alternatively, an example sensor can detect forward displacement of the rotor shaft 506 with respect to the stator 510. The example controller circuitry 904 can decrease an amount of current to supply to the motor, which reduces the speed of the motor 502 and decreases the resultant forces 524, 526 (induced by the generally conical shape of the rotor 508 and the stator 510). As such, the decreased resultant forces 524, 526 moves the rotor 508 and the rotor shaft 506 aft in the pump system 500, which balances the initial forward displacement of the rotor shaft 506.

Figure 10:
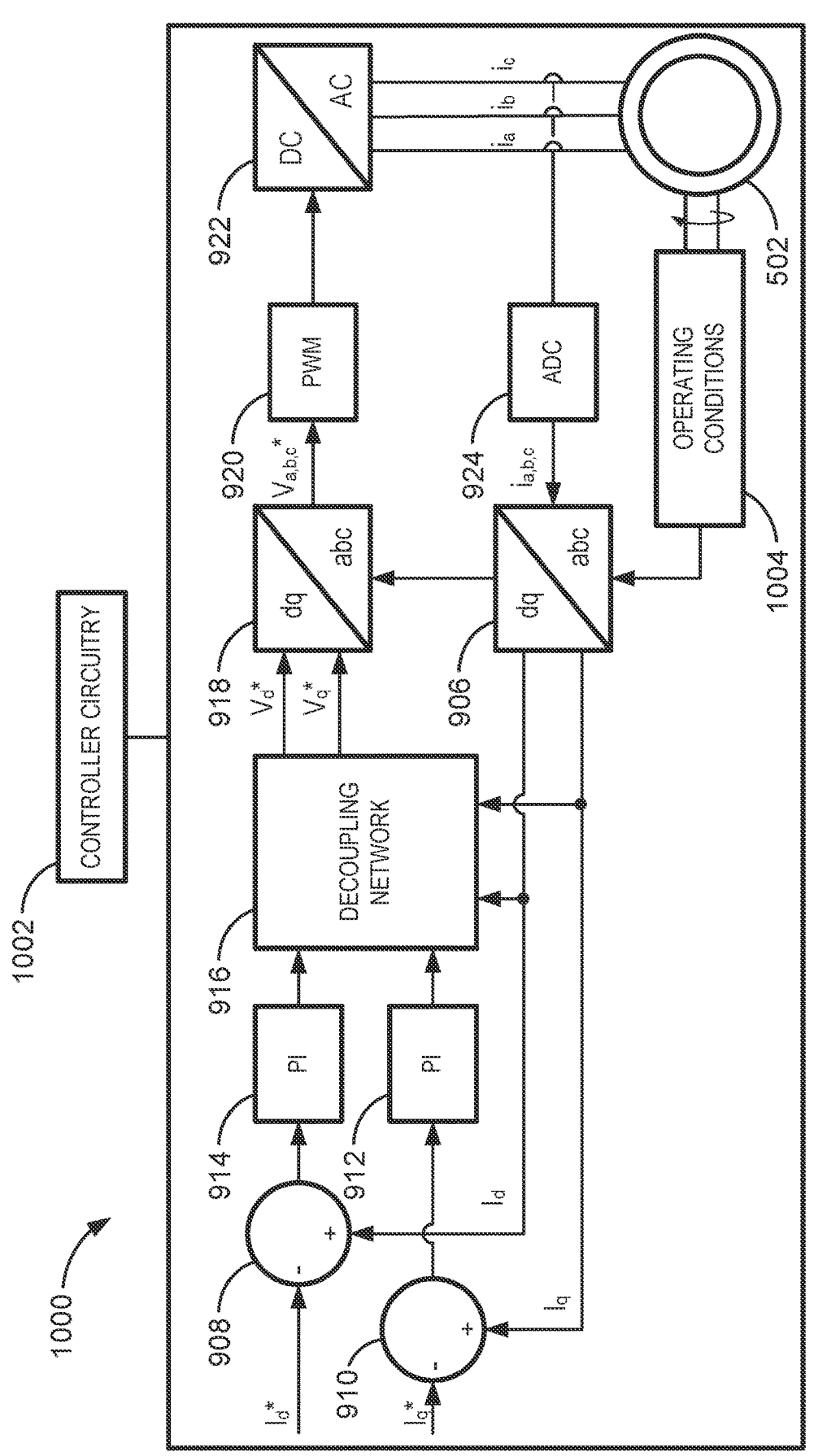
FIG. 10 is an example diagram of a second example process to control current flow provided to an example electric motor.

FIG. 10 is an example diagram of a second example process 1000 to control current flow provided to an example electric motor. For purposes of explanation, the example process 1000 is described with respect to the example pump system 500 of FIG. 5. However, the example process 1000 can be implemented in the example pump system 600 of FIG. 6, the example pump system 700 of FIG. 7, or the example pump system 800 of FIG. 8. The example process 1000 of FIG. 10 is similar to the example process 900 of FIG. 9. However, instead of example sensor output data 902, example controller circuitry 1002 accesses example operating conditions 1004 of the pump system 500 to determine current supply to the motor 502. In some examples, the operating conditions 1004 of the pump system 500 can include motor speed, motor temperature, etc. For example, when the operating conditions 1004 of the pump system 500 indicate that the motor 502 is operating at a relatively high speed (e.g., 60,000 rpm), the example controller circuitry 1002 can adjust current supply to the motor 502 to balance the displacement between the rotor shaft 506. In some examples, the speed of the motor 502 may be compared to an example threshold. For example, if the speed of the motor 502 exceeds the example threshold, then the example controller circuitry 904 may decrease the current supply to the motor 502 to prevent or limit forward displacement of the rotor shaft 506 with respect to the stator 510. In this example, reducing the speed of the motor 502 can decrease the magnitude of the resultant forces 524, 526 (induced by the generally conical shape of the rotor 508 and the stator 510) and balance the forward displacement of the rotor shaft 506. Accordingly, the example controller circuitry 1002 can determine current flow supplied to the motor 502 based on the operating conditions 1004 of the pump system 500.

Figure 11:
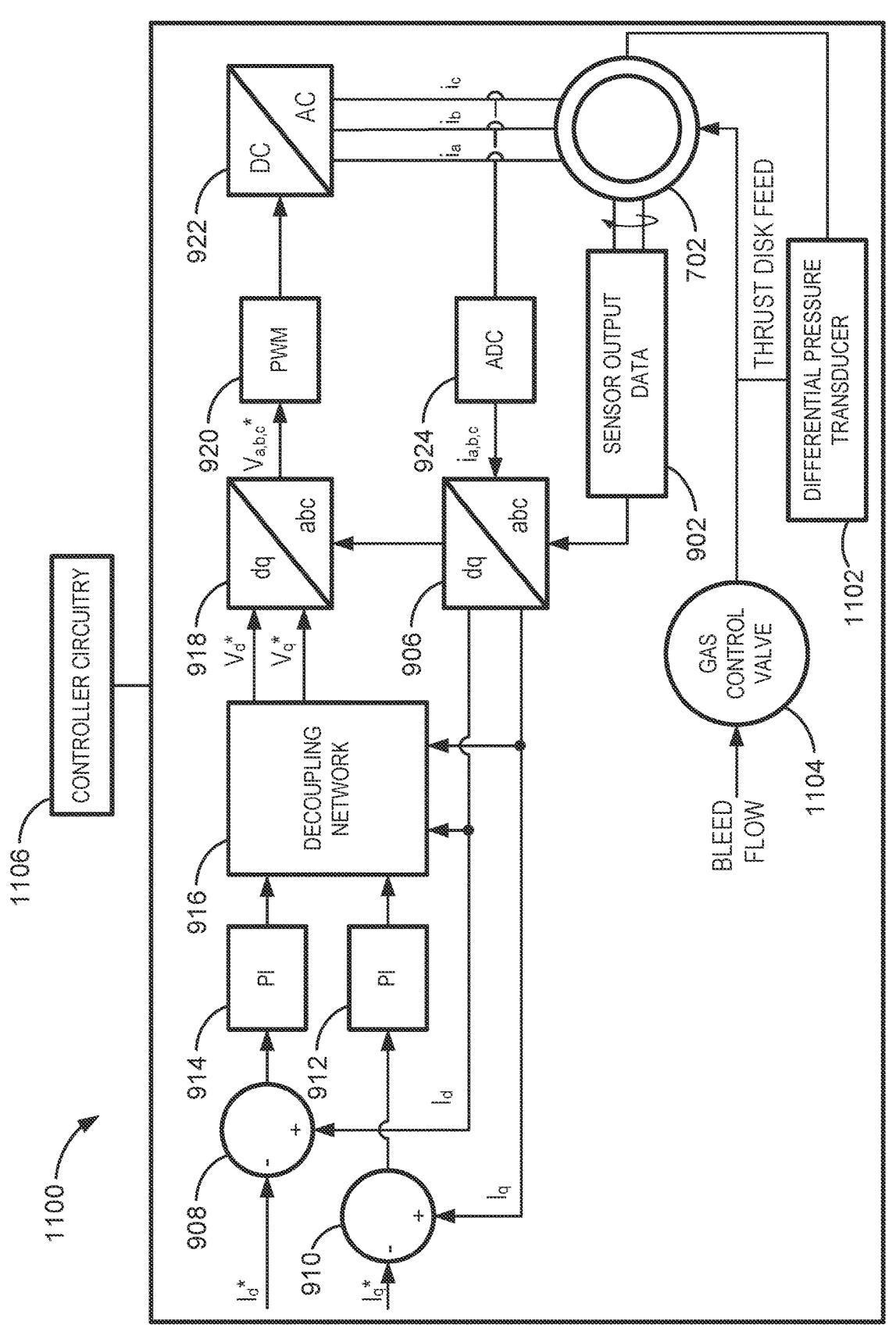
FIG. 11 is an example diagram of a third example process to control current flow provided to an example electric motor.

FIG. 11 is an example diagram of a third example process 1100 to control current flow provided to an example electric motor. For purposes of explanation, the example process 1100 is described with respect to the example pump system 700 of FIG. 7. However, the example process 1100 can also be implemented in the example pump system 800 of FIG. 8. The example process 1100 of FIG. 11 is similar to the example process 900 of FIG. 9. However, example process 1100 further includes an example differential pressure transducer 1102 and an example gas control valve 1104. The example differential pressure transducer 1102 detects (e.g., monitors, senses, etc.) pressure balances/imbalances associated with the thrust discs 710. The example gas control valve 1104 can permit or inhibit bleed flow into example bearing chambers corresponding to the thrust discs 710. As such, the example gas control valve 1104 may change the pressure levels within the bearing chambers. In this example, the differential pressure transducer 1102 is coupled to the gas control valve 1104. Thus, the example differential pressure transducer 1102 can monitor pressure (e.g., changes in pressure) associated with the gas control valve 1104. The example gas control valve 1104 and the example differential pressure transducer 1102 may be positioned in piping external to (e.g., outside of) the motor 702.

In some examples, example controller circuitry 1106 determines current supply to the motor 702 based on pressure data from the differential pressure transducer 1102. For example, axial displacement of the rotor shaft 704 may cause axial displacement of the thrust discs 710. Such displacement of the thrust discs 710 will induce a pressure imbalance on forward or aft sides of the thrust discs 710. The example differential pressure transducer 1102 can detect this pressure imbalance associated with the thrust discs 710. In particular, this pressure imbalance data can indicate axial displacement of the thrust discs 710 and, thus, axial displacement of the rotor shaft 704. The example controller circuitry 1106 can adjust current supply to the motor 702 to balance this displacement between the rotor shaft 704 and the stator 708. Accordingly, the example controller circuitry 1106 can determine current flow supplied to the motor 702 based on displacement of the rotor shaft 704 (determined by the sensor output data 902) and pressure imbalance data associated with the thrust discs 710.

Figure 12:
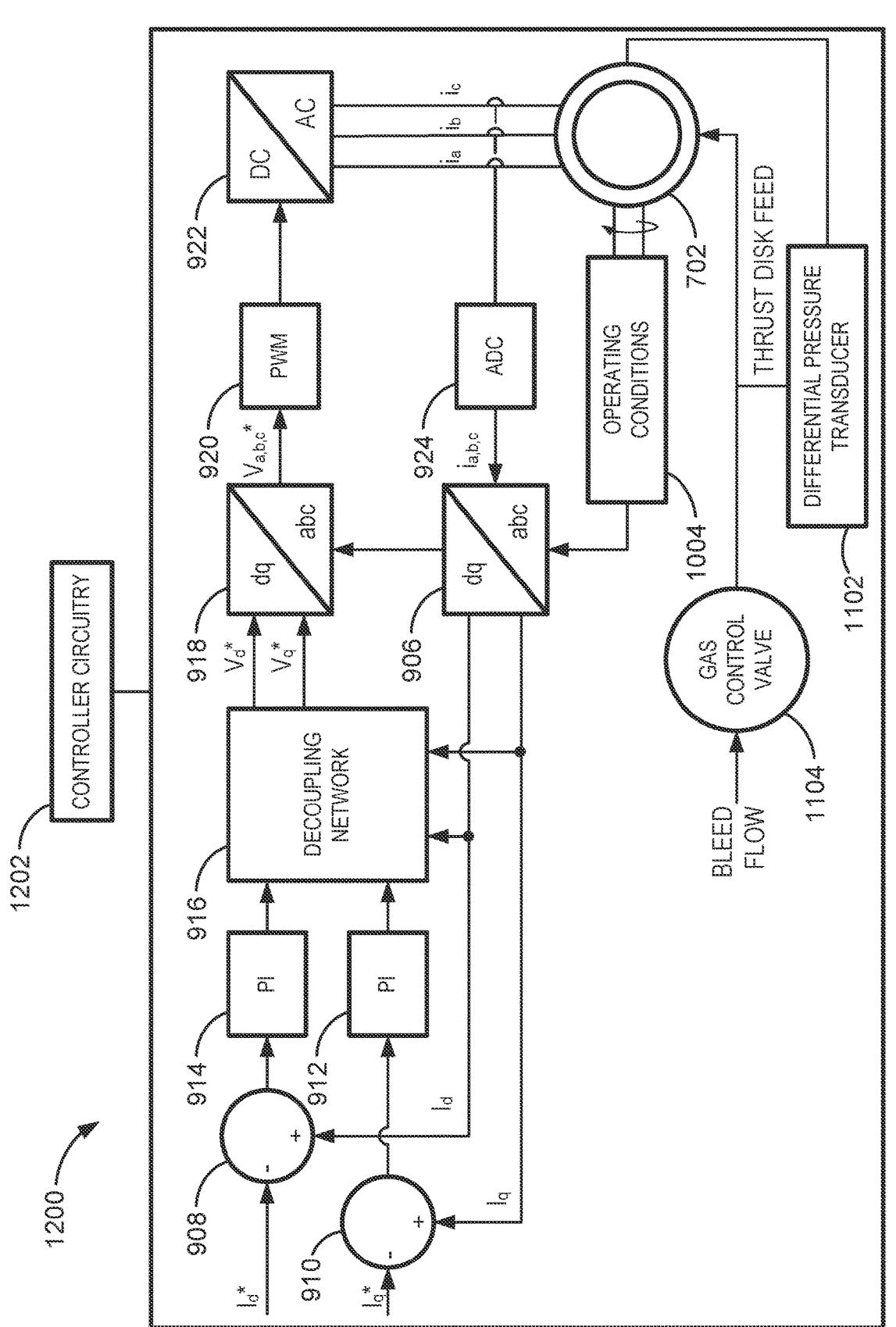
FIG. 12 is an example diagram of a fourth example process to control current flow provided to an example electric motor.

FIG. 12 is an example diagram of a fourth example process 1200 to control current flow provided to an example electric motor. For purposes of explanation, the example process 1200 is described with respect to the example pump system 700 of FIG. 7. However, the example process 1200 can be implemented in the example pump system 800 of FIG. 8. The example process 1200 of FIG. 12 is similar to the example process 1100 of FIG. 11. However, instead of example sensor output data 902, example controller circuitry 1202 accesses the operating conditions 1004 of the pump system 700 and pressure output data to determine current supply to the motor 702. For example, the example controller circuitry 1202 can determine a position estimation (e.g., displacement estimation) of the rotor shaft 704 based on the operating conditions 1004 of the pump system 700. Further, the example controller circuitry 1202 accesses pressure data from the differential pressure transducer 1102. In this example, the differential pressure transducer 1102 detects pressure imbalances associated with the thrust discs 710. For example, the differential pressure transducer 1102 can detect pressure imbalances due to axial displacement of the rotor shaft 704 and the thrust discs 710. Accordingly, the example controller circuitry 1202 can determine current flow to supply to the motor 702 based on a position estimation of the rotor shaft 704 and pressure imbalance data associated with the thrust discs 710.

Figure 13:
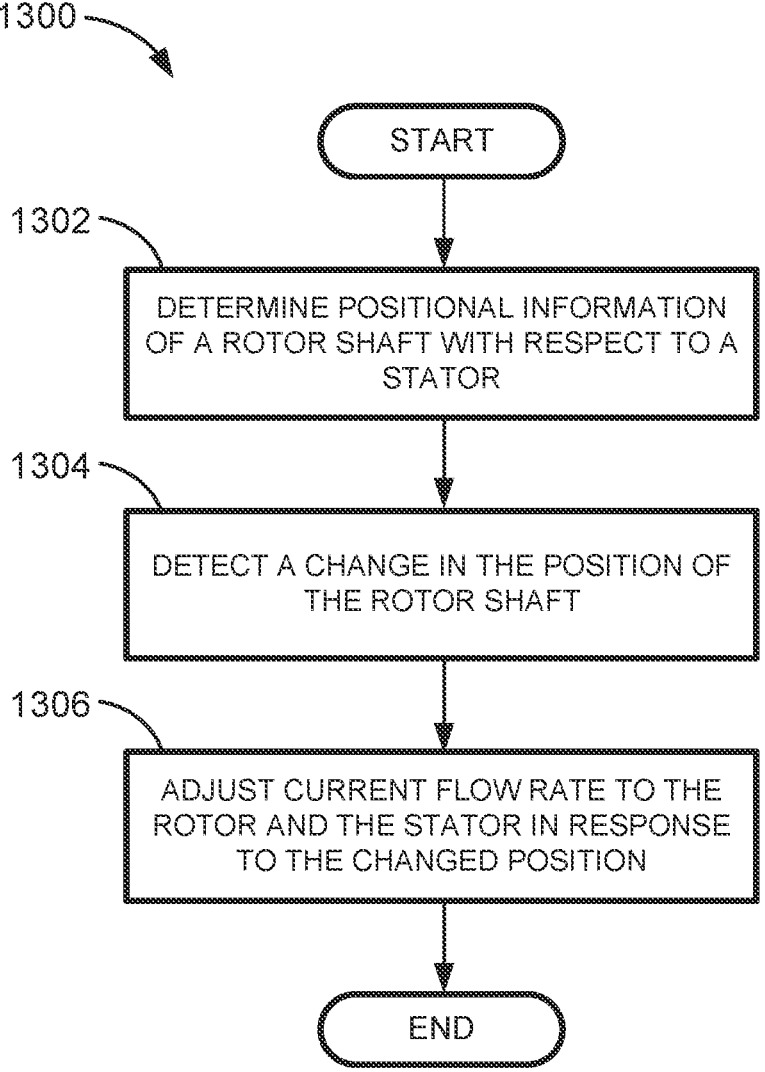
FIG. 13 is a flowchart representative of example machine readable instructions or example operations that may be executed by example processor circuitry to implement the processes of FIGS. 9-12.

A flowchart representative of example machine readable instructions, which may be executed to configure processor circuitry to implement the controller circuitry 904 of FIG. 9, the controller circuitry 1002 of FIG. 10, the controller circuitry 1106 of FIG. 11, or the controller circuitry 1202 of FIG. 12, is shown in FIG. 13. The machine readable instructions may be one or more executable programs or portion(s) of an executable program for execution by processor circuitry, such as the processor circuitry 1412 shown in the example processor platform 1400 discussed below in connection with FIG. 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 13, many other methods of implementing the controller circuitry 904, the controller circuitry 1002, the controller circuitry 1106, or the controller circuitry 1202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 13 is a flowchart representative of an example method 1300 described with respect to the example pump systems 500, 600, 700, 800 of FIGS. 5-8, respectively and the example processes 900, 1000, 1100, 1200 of FIGS. 9-12, respectively. The example method 1300 controls current flow provided to example electric motors disclosed herein (e.g., the motor 502, the motor 602, the motor 702, the motor 802). The method 1300 begins at block 1302, at which example controller circuitry (e.g., the controller circuitry 904, the controller circuitry 1002, the controller circuitry 1106, the controller circuitry 1202) determines positional information of an example rotor shaft (e.g., the rotor shaft 506, the rotor shaft 604, the rotor shaft 704, the rotor shaft 804) with respect to an example stator (e.g., the stator 510, the stator 608, the stator 708, the stator 808). In some examples, the controller circuitry 904 determines positional information (e.g., first positional information, initial positional information, a first axial location, etc.) of the rotor shaft 506 with respect to the stator 510.

At block 1304, the example controller circuitry 904 detects a change in the position of the rotor shaft 506. In some examples, the controller circuitry 904 detects second positional information (e.g., changed positional information, a second axial location, etc.) of the rotor shaft 506 with respect to the stator 510. In some examples, the second positional information is different from the first positional information. In some examples, the controller circuitry 904 determines that the second positional location is either forward of the stator 510 or aft of the stator 510. As such, the example controller circuitry 904 can determine forward movement/displacement or aft movement/displacement of the rotor shaft 506. In some examples, the controller circuitry 904 can detect the changed position of the rotor shaft 506 via sensor output data 902 from an example sensor positioned adjacent to the rotor 508. In some examples, the sensor output data 902 includes the first positional information and the second positional information.

In some examples, the controller circuitry 1002 or the controller circuitry 1202 determines the second positional information based on operating conditions (e.g., speed) of the rotor 706 and the rotor shaft 704. In some examples, the controller circuitry 1106 or the controller circuitry 1202 can detect the changed position of the rotor shaft 704 via pressure data from the differential pressure transducer 1102 positioned adjacent to the thrust discs 710. For example, the differential pressure transducer 1102 can obtain pressure data corresponding to forward and aft sides of the thrust discs 710. In such examples, the example controller circuitry 1106 can detect a changed position of the thrust discs 710 based on the pressure data. Accordingly, the changed position of the thrust discs 710 (connected to the rotor shaft 704) can indicate a changed position of the rotor shaft 704.

At block 1306, the example controller circuitry 904 adjusts a current flow rate (e.g., an amount of current, current supply, current flow, etc.) associated with the rotor 508 and the stator 510 (the motor 502) in response to the changed position of the rotor shaft 506. In some examples, the controller circuitry 904 adjusts the current flow rate based on the second positional information. In some examples, the controller circuitry 904 increases the current flow to the rotor 508 and the stator 510 in response to forward movement of the rotor shaft 506. In other examples, the controller circuitry 904 decreases the current flow to the rotor 508 and the stator 510 in response to aft movement of the rotor shaft 506.

Figure 14:
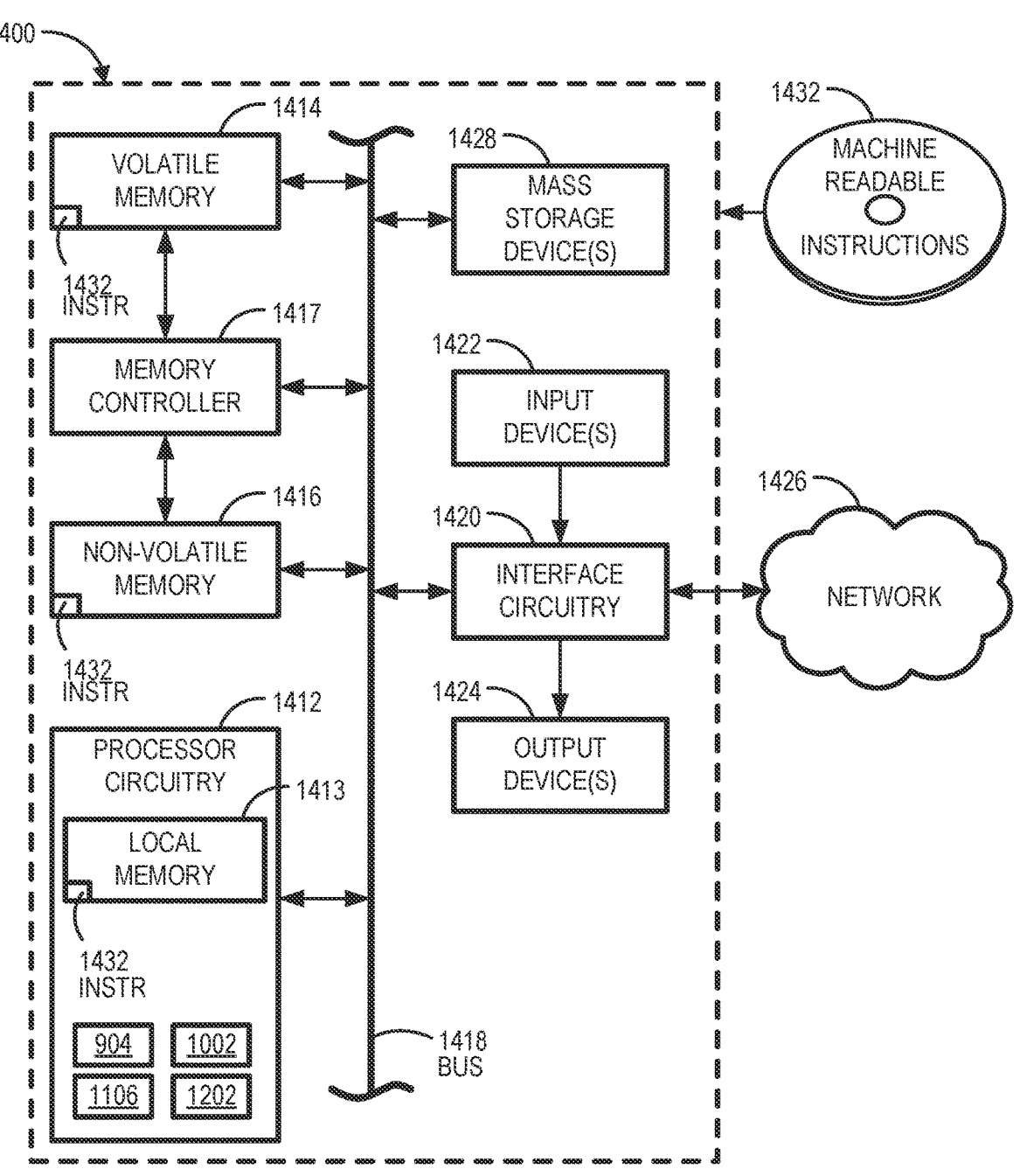
FIG. 14 is a block diagram of an example processing platform including processor circuitry structured to execute the example machine readable instructions and/or the example operations of FIG. 13.

FIG. 14 is a block diagram of an example processor platform 1400 structured to execute and/or instantiate the machine readable instructions and/or the operations of FIG. 13 to implement the example processes 900, 1000, 1100, 1202. The processor platform 1400 can be, for example, a server, a personal computer, a workstation, a self-learning machine (e.g., a neural network) or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs, micropro- cessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example controller circuitry 904, the example controller circuitry 1002, the example controller circuitry 1106, or the example controller circuitry 1202 of FIGS. 9-12, respectively.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the volatile memory 1414 and non-volatile memory 1416 of the illus- trated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® inter- face, a near field communication (NFC) interface, a Periph- eral Component Interconnect (PCI) interface, and/or a Peripheral Component Interconnect Express (PCIe) inter- face.

In the illustrated example, one or more input devices 1422 are connected to the interface circuitry 1420. The input device(s) 1422 permit(s) a user to enter data and/or com- mands into the processor circuitry 1412. The input device(s) 1422 can be implemented by, for example, a positional sensor, a pressure sensor, etc.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or a tactile output device.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connec- tion, a coaxial cable system, a satellite system, a line-of-site wireless system, a cellular telephone system, an optical connection, etc.

The processor platform 1400 of the illustrated example also includes one or more mass storage device(s) 1428 to store software and/or data. Examples of such mass storage device(s) 1428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1432, which may be implemented by the machine readable instructions of FIG. 13, may be stored in the mass storage device(s) 1428, in the volatile memory 1414, in the non-volatile memory 1416, and/or on a removable non-transitory computer readable storage medium such as a CD or DVD.

In some examples, the systems 400, 500, 600, 700, 800 include means for accelerating. For example, the means for accelerating may be implemented by the motor 410 in FIG. 4, the motor 502 in FIG. 5, the motor 602 in FIG. 6, the motor 702 in FIG. 7, the motor 804 in FIG. 8, and/or any other motors described herein.

In some examples, the systems 400, 500, 600, 700, 800 include means for rotating. For example, the means for rotating may be implemented by the rotor 430 in FIG. 4, the rotor 508 in FIG. 5, the rotor 606 in FIG. 6, the rotor 706 in FIG. 7, the rotor 806 in FIG. 8, and/or any other rotors described herein.

In some examples, the systems 400, 500, 600, 700, 800 include means for providing torque. For example, the means for providing torque may be implemented by the stator 428 of FIG. 4, the stator 510 of FIG. 5, the stator 608 of FIG. 6, the stator 708 of FIG. 7, the stator 808 of FIG. 8, and/or any other stators described herein.

In some examples, the systems 400, 500, 600, include means for framing. For example, the means for framing may be implemented by the motor housing 412 of FIG. 4, the motor housing 522 of FIG. 5, the motor housing 622 of FIG. 6, and/or any other motor housings described herein.

In some examples, the systems 700, 800 include means for supporting. For example, the means for supporting may be implemented by the thrust discs 710 of FIG. 7, the thrust discs 812 of FIG. 8, and/or any other thrust discs described herein.

In some examples, the system 800 includes means for sealing. For example, the means for sealing may be imple- mented by the piston seals 810 in FIG. 8 and/or any other seals described herein.

In some examples, the systems 400, 500, 600, 700, 800 include means for driving. For example, the means for driving may be implemented by the impeller shaft 432 of FIG. 4, the rotor shaft 506 of FIG. 5, the rotor shaft 604 of FIG. 6, the rotor shaft 704 of FIG. 7, the rotor shaft 804 of FIG. 8, and/or any other shaft described herein.

In some examples, the systems 400, 500, 600, 700, 800 include means for sensing. For example, the means for sensing may be implemented by the example sensor detecting positional information of any one of the motors 410, 502, 602, 702, 804 and/or any other sensor described herein.

Conical rotors for use in pumps are disclosed herein. Example electric motors disclosed herein can adjust torque output of an example pump to mitigate axial movement of the impeller shaft. Examples disclosed herein utilize conical rotors and conical stators to increase the available torque at the impeller shaft. For example, an axial component of the electromagnetic force between the conical rotor and the conical stator can balance axial load on the impeller shaft. The electromagnetic force due to the interaction between the conical rotor and the conical stator can cause the conical rotor and the rotor shaft to move forward in the pump. This forward movement of the rotor and rotor shaft can counteract aft movement of the pump during operation. Further, examples disclosed herein can increase current flow to an example electric motor in response to axial displacement of the impeller shaft. Additionally or alternatively, examples disclosed herein can adjust current flow to an example electric motor in response to operating conditions (e.g., rotational speeds, ambient temperature, etc.) of the example impeller shaft. Furthermore, example systems disclosed herein can improve the operational efficiency of the pump (e.g., centrifugal sCO$_2$ pump) by minimizing or otherwise reducing frictional energy losses associated with axial impeller shaft movement.

Conical motors for use with pumps are disclosed herein. Further aspects of the present disclosure are provided by the subject matter of the following clauses:

An apparatus comprising an electric motor including a conical rotor, a first end of the conical rotor having a first diameter and a second end of the conical rotor having a second diameter, the second diameter different from the first diameter, and a conical stator aligned to the conical rotor.

The apparatus of any preceding clause, further including a housing to enclose the electric motor, the conical rotor, and the conical stator.

The apparatus of any preceding clause, wherein the first diameter is less than the second diameter.

The apparatus of any preceding clause, wherein the conical stator is concentrically aligned to the conical rotor.

The apparatus of any preceding clause, further including a thrust disc positioned forward of the electric motor.

The apparatus of any preceding clause, further including at least one seal positioned forward of the thrust disc, the thrust disc to contact the at least one seal in response to axial movement of the thrust disc.

The apparatus of any preceding clause, further including an impeller shaft coupled to the conical rotor.

The apparatus of any preceding clause, further including a sensor positioned adjacent to the electric motor, the sensor to detect movement of the impeller shaft.

An electric motor comprising a rotor fixedly coupled to a shaft, the rotor including at least one tapered surface, and a stator magnetically coupled to the rotor, the stator positioned to surround the at least one tapered surface.

The electric motor of any preceding clause, wherein the at least one tapered surface is a first tapered surface, wherein the stator includes a second tapered surface, the second tapered surface aligned to the first tapered surface.

The electric motor of any preceding clause, wherein the rotor includes a third tapered surface, the first tapered surface positioned at a first angle, the third tapered surface positioned at a second angle, the second angle different from the first angle.

The electric motor of any preceding clause, wherein the at least one tapered surface faces away from the shaft.

An apparatus comprising a rotor having an inner surface and an outer surface, the inner surface facing a shaft, and a stator positioned to surround the outer surface of the rotor, at least a portion of the outer surface being a tapered surface.

The apparatus of any preceding clause, wherein the at least a portion of the outer surface is a first portion and the tapered surface is a first tapered surface, the rotor including a second portion positioned adjacent to the first portion, the second portion including a second tapered surface, an angle of the second tapered surface different from an angle of the first tapered surface.

The apparatus of any preceding clause, wherein the first tapered surface is approximately parallel to the shaft.

The apparatus of any preceding clause, further including controller circuitry to determine first positional information of the shaft with respect to the stator, detect second positional information of the shaft with respect to the stator, the second positional information different from the first positional information, and adjust current flow to the rotor and the stator based on the second positional information of the shaft.

The apparatus of any preceding clause, further including a sensor positioned adjacent to the rotor, the sensor to obtain data pertaining to the first positional information and the second positional information.

The apparatus of any preceding clause, wherein the controller circuitry obtains the second positional information based on an operating speed of the rotor and the shaft.

The apparatus of any preceding clause, wherein the second positional information indicates forward movement of the shaft, wherein the controller circuitry increases the current flow to the rotor and the stator in response to the forward movement.

The apparatus of any preceding clause, wherein the second positional information indicates aft movement of the shaft, wherein the controller circuitry decreases the current flow to the rotor and the stator in response to the aft movement.

An apparatus comprising at least one memory, machine readable instructions, and programmable circuitry to execute the machine readable instructions to determine first positional information of a rotor shaft with respect to a stator, the rotor shaft fixedly coupled to a rotor, the stator surrounding the rotor, detect second positional information of the rotor shaft with respect to the stator, the second positional information different from the first positional information, and adjust current flow to the rotor and the stator based on the second positional information of the rotor shaft.

The apparatus of any preceding clause, further including controller circuitry to obtain sensor output data from a sensor positioned adjacent to the rotor, the sensor output data including the first positional information and the second positional information.

The apparatus of any preceding clause, wherein the first positional information indicates a first axial location of the rotor shaft and the second positional information indicates a second axial location of rotor shaft, the second axial location either forward of the stator or aft of the stator.

The apparatus of any preceding clause, wherein the programmable circuitry is to determine the second positional information based on a speed of the rotor and the rotor shaft.

The apparatus of any preceding clause, further including controller circuitry to obtain pressure data from a differential pressure transducer positioned adjacent to a thrust disc, the thrust disc coupled to the rotor shaft, wherein the programmable circuitry is to detect the second positional information based on the pressure data.

The apparatus of any preceding clause, wherein the second positional information indicates forward movement of the rotor shaft, wherein the programmable circuitry is to increase the current flow to the rotor and the stator in response to the forward movement.

The apparatus of any preceding clause, wherein the second positional information indicates aft movement of the rotor shaft, wherein the programmable circuitry is to decrease the current flow to the rotor and the stator in response to the aft movement.

A method comprising detecting a change in a position of a rotor shaft with respect to a stator, the rotor shaft connected to a rotor, the stator magnetically coupled to the rotor, and in response to the changed position of the rotor shaft, adjusting a current flow rate associated with the stator and the rotor.

The method of any preceding clause, wherein the changed position is detected via a sensor coupled to the rotor shaft.

The method of any preceding clause, further including detecting a change in a position of a thrust disc, the changed position of the thrust disc associated with the changed position of the rotor shaft.

The method of any preceding clause, wherein the changed position of the thrust disc is detected via a pressure transducer associated with the thrust disc, the pressure transducer obtaining pressure data corresponding to forward and aft sides of the thrust disc.

An apparatus comprising means for accelerating including means for rotating, a first end of the means for rotating having a first diameter and a second end of the means for rotating having a second diameter, the second diameter different from the first diameter, and means for providing torque aligned to the means for rotating.

The apparatus of any preceding clause, further including means for framing to enclose the means for accelerating, the means for rotating, and the means for providing torque.

The apparatus of any preceding clause, wherein the first diameter is less than the second diameter.

The apparatus of any preceding clause, wherein the means for providing torque is concentrically aligned to the means for rotating.

The apparatus of any preceding clause, further including a means for supporting positioned forward of the means for accelerating.

The apparatus of any preceding clause, further including means for sealing positioned forward of the means for supporting, the means for supporting to contact means for sealing in response to axial movement of the means for supporting.

The apparatus of any preceding clause, further including a means for driving coupled to the means for rotating.

The apparatus of any preceding clause, further including means for sensing positioned adjacent to the means for accelerating, the means for sensing to detect movement of the means for driving.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   an electric motor including a conical rotor, a first end of the conical rotor having a first diameter and a second end of the conical rotor having a second diameter, the second diameter different from the first diameter; and
   a conical stator aligned to the conical rotor, the conical stator positioned to surround a tapered surface, wherein the tapered surface is shaped to angulate a magnetic force, an angulation of the magnetic force to initiate a forward movement of the conical rotor to counteract an aft movement of an impeller shaft.

2. The apparatus of claim 1, further including a housing to enclose the electric motor, the conical rotor, and the conical stator.

3. The apparatus of claim 1, wherein the first diameter is less than the second diameter.

4. The apparatus of claim 1, wherein the conical stator is concentrically aligned to the conical rotor.

5. The apparatus of claim 1, further including a thrust disc positioned forward of the electric motor.

6. The apparatus of claim 5, further including at least one seal positioned forward of the thrust disc, the thrust disc to contact the at least one seal in response to axial movement of the thrust disc.

7. The apparatus of claim 1, further including the impeller shaft coupled to the conical rotor.

8. The apparatus of claim 7, further including a sensor positioned adjacent to the electric motor, the sensor to detect movement of the impeller shaft.

9. An electric motor comprising:
   a rotor fixedly coupled to a shaft, the rotor including at least one tapered surface; and
   a stator magnetically coupled to the rotor, the stator positioned to surround the at least one tapered surface, wherein the at least one tapered surface is shaped to tilt a magnetic force between the rotor and the stator, the magnetic force to initiate a forward movement of the rotor and the shaft.

10. The electric motor of claim 9, wherein the at least one tapered surface is a first tapered surface, wherein the stator includes a second tapered surface, the second tapered surface aligned to the first tapered surface.

11. The electric motor of claim 10, wherein the rotor includes a third tapered surface, the first tapered surface positioned at a first angle, the third tapered surface positioned at a second angle, the second angle different from the first angle.

12. The electric motor of claim 9, wherein the at least one tapered surface faces away from the shaft.

13. An apparatus comprising:
   a rotor having an inner surface and an outer surface, the inner surface facing a shaft;
   a stator positioned to surround the outer surface of the rotor, at least a portion of the outer surface being a tapered surface; and
   controller circuitry to:
      determine first positional information of the shaft with respect to the stator;
      detect second positional information of the shaft with respect to the stator, the second positional information different from the first positional information; and adjust current flow to the rotor and the stator based on the second positional information of the shaft, wherein the second positional information indicates forward movement of the shaft, wherein the controller circuitry increases the current flow to the rotor and the stator in response to the forward movement.

14. The apparatus of claim 13, wherein the at least a portion of the outer surface is a first portion and the tapered surface is a first tapered surface, the rotor including a second portion positioned adjacent to the first portion, the second portion including a second tapered surface, an angle of the second tapered surface different from an angle of the first tapered surface.

15. The apparatus of claim 14, wherein the first tapered surface is approximately parallel to the shaft.

16. The apparatus of claim 13, further including a sensor positioned adjacent to the rotor, the sensor to obtain data pertaining to the first positional information and the second positional information.

17. The apparatus of claim 13, wherein the controller circuitry obtains the second positional information based on an operating speed of the rotor and the shaft.

18. The apparatus of claim 13, wherein the second positional information indicates aft movement of the shaft, wherein the controller circuitry decreases the current flow to the rotor and the stator in response to the aft movement.

* * * * *